(12) United States Patent
Tenny et al.

(10) Patent No.: US 10,728,747 B2
(45) Date of Patent: Jul. 28, 2020

(54) SYSTEM AND METHOD FOR USER EQUIPMENT IDENTIFICATION AND COMMUNICATIONS

(71) Applicant: Futurewei Technologies, Inc., Plano, TX (US)

(72) Inventors: Nathan Edward Tenny, Portland, OR (US); William Anthony Gage, Stittsville (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/028,184

(22) Filed: Jul. 5, 2018

(65) Prior Publication Data

US 2018/0332467 A1 Nov. 15, 2018

Related U.S. Application Data

(63) Continuation of application No. 15/586,687, filed on May 4, 2017.

(Continued)

(51) Int. Cl.
*H04W 8/26* (2009.01)
*H04L 29/06* (2006.01)
(Continued)

(52) U.S. Cl.
CPC ............ *H04W 8/26* (2013.01); *H04L 63/061* (2013.01); *H04L 63/123* (2013.01); *H04W 8/18* (2013.01);
(Continued)

(58) Field of Classification Search
CPC .... H04L 63/123; H04L 63/061; H04W 76/11; H04W 8/18; H04W 74/0808;
(Continued)

(56) References Cited

U.S. PATENT DOCUMENTS 7,912,471 B2 3/2011 Kodikara Patabandi et al.
8,514,756 B1 * 8/2013 Ramachandra ..... H04L 61/2069
370/310

(Continued)

FOREIGN PATENT DOCUMENTS

WO 2010090440 A2 8/2010
WO 2016114691 A1 7/2016
WO 2018144961 A1 8/2018

OTHER PUBLICATIONS

"3rd Generation Partnership Project; Technical Specification Group Radio Access Network; Study on New Radio Access Technology; Radio Access Architecture and Interfaces (Release 14)," 3GPP TR 38.801, V1.1.0, Jan. 2017, 83 pages.

(Continued)

*Primary Examiner* — Mehmood B. Khan
(74) *Attorney, Agent, or Firm* — Slater Matsil, LLP

(57) ABSTRACT

A method for identifier management for user devices operating in an inactive mode includes receiving a first uplink transmission including a user device identifier associated with a user device, transmitting a first downlink transmission including an indication of an ephemeral identifier assigned to the user device, transmitting a second downlink transmission including data associated with the ephemeral identifier, and discarding the ephemeral identifier.

14 Claims, 16 Drawing Sheets

Related U.S. Application Data

(60) Provisional application No. 62/458,241, filed on Feb. 13, 2017.

(51) Int. Cl.

| | | |
|---|---|---|
| *H04W 76/11* | (2018.01) | |
| *H04W 8/18* | (2009.01) | |
| *H04W 12/04* | (2009.01) | |
| *H04W 12/10* | (2009.01) | |
| *H04W 36/00* | (2009.01) | |
| *H04W 74/08* | (2009.01) | |
| *H04W 76/27* | (2018.01) | |

(52) U.S. Cl.
CPC .......... *H04W 12/04* (2013.01); *H04W 12/10* (2013.01); *H04W 36/0033* (2013.01); *H04W 74/0808* (2013.01); *H04W 76/11* (2018.02); *H04W 76/27* (2018.02)

(58) Field of Classification Search
CPC . H04W 12/04; H04W 12/10; H04W 36/0033; H04W 8/26
See application file for complete search history.

(56) References Cited

U.S. PATENT DOCUMENTS

| | | | | |
|---|---|---|---|---|
| 10,383,159 | B2* | 8/2019 | Yi | H04L 67/1078 |
| 2007/0242703 | A1* | 10/2007 | Pelletier | H04W 28/06 370/521 |
| 2011/0138192 | A1* | 6/2011 | Kocher | G06F 21/575 713/189 |
| 2012/0113926 | A1 | 5/2012 | Ou et al. | |
| 2013/0021979 | A1 | 1/2013 | Kwon et al. | |
| 2013/0042115 | A1 | 2/2013 | Sweet et al. | |
| 2013/0298209 | A1* | 11/2013 | Targali | H04L 63/0815 726/6 |
| 2015/0036593 | A1* | 2/2015 | Uchino | H04W 76/19 370/328 |
| 2015/0043455 | A1 | 2/2015 | Miklos et al. | |
| 2015/0215825 | A1* | 7/2015 | Kim | H04W 36/0088 370/331 |
| 2015/0215987 | A1* | 7/2015 | Kim | H04L 1/18 370/329 |
| 2015/0372978 | A1* | 12/2015 | Bharrat | H04L 63/0227 726/13 |
| 2016/0036700 | A1* | 2/2016 | Unnimadhavan | H04L 45/74 370/392 |
| 2016/0234714 | A1* | 8/2016 | Basu Mallick | H04W 28/085 |
| 2017/0041767 | A1* | 2/2017 | Vajapeyam | H04W 80/02 |
| 2017/0222943 | A1* | 8/2017 | Yao | H04L 47/624 |
| 2018/0124718 | A1* | 5/2018 | Ng | H04B 7/15 |
| 2018/0227851 | A1* | 8/2018 | Kubota | H04W 36/0033 |
| 2018/0234890 | A1* | 8/2018 | Shih | H04W 60/00 |
| 2018/0343584 | A1* | 11/2018 | Yi | H04L 69/324 |
| 2019/0021128 | A1* | 1/2019 | Sivavakeesar | H04W 4/70 |
| 2019/0045408 | A1* | 2/2019 | Kim | H04W 76/22 |

OTHER PUBLICATIONS

"3rd Generation Partnership Project; Technical Specification Group Radio Access Network; Study on New Radio Access Technology; Radio Interface Protocol Aspects (Release 14)," 3GPP TR 38.804, V0.5.1, Feb. 2017, 47 pages.

"3rd Generation Partnership Project; Technical Specification Group Services and System Aspects; 3GPP System Architecture Evolution (SAE); Security architecture (Release 8)," 3GPP TS 33.401, V8.8.0, Jun. 2011, 99 pages.

"3rd Generation Partnership Project; Technical Specification Group Radio Access Network; Evolved Universal Terrestrial Radio Access (E-UTRA); Multiplexing and channel coding (Release 8)," 3GPP TS 36.212, V8.8.0, Dec. 2009, 60 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.12.0, Mar. 2010, 149 pages.

"3rd Generation Partnership Project; Technical Specification Group Radio Access Network; Evolved Universal Terrestrial Radio Access (E-UTRA); Medium Access Control (MAC) protocol specification (Release 8)," 3GPP TS 36.321, V8.12.0, Mar. 2012, 47 pages.

"3rd Generation Partnership Project; Technical Specification Group Radio Access Network; Evolved Universal Terrestrial Radio Access (E-UTRA); Radio Link Control (RLC) protocol specification (Release 8)," 3GPP TS 36.322, V8.8.0, Jun. 2010, 39 pages.

"3rd Generation Partnership Project; Technical Specification Group Radio Access Network; Evolved Universal Terrestrial Radio Access (E-UTRA); Packet Data Convergence Protocol (PDCP) specification (Release 8)," 3GPP TS 36.323, V8.6.0, Jun. 2009, pp. 1-24.

"3rd Generation Partnership Project; Technical Specification Group Radio Access Network; Evolved Universal Terrestrial Radio Access (E-UTRA); Radio Resource Control (RRC); Protocol specification (Release 8)," 3GPP TS 36.331, V8.21.0, Jun. 2014, 219 pages.

"3rd Generation Partnership Project; Technical Specification Group Radio Access Network; Evolved Universal Terrestrial Radio Access Network (E-UTRAN); X2 application protocol (X2AP) (Release 8)," 3GPP TS 36.423, V8.9.0, Mar. 2010, 100 pages.

Huawei, "UL data transmission without RRC signalling without initiating transition to active (option A)," 3GPP TSG-RAN NR Adhoc, R2-1700185, Agenda Item 3.2.2.2, Spokane, Washington, USA, Nov. 14-18, 2016, 25 pages.

Huawei, et al., "Discussion on grant-free transmission," 3GPP TSG RAN WG1 Meeting #86, R1-166095, Agenda Item 8.1.2.2, Gothenburg, Sweden, Aug. 22-26, 2016, 5 pages.

RAN2 Chairman, "Agenda," 3GPP TSG-RAN WG2 NR Ad Hoc, Spokane, USA, Jan. 17-19, 2017, 51 pages.

Oppo, "Issues on Data transmission in 'Inactive' State," 3GPP TSG-RAN2 Meeting #96, R2-1700051, Agenda Item 3.2.2.2, Spokane, USA, Jan. 17-19, 2017, 5 pages.

NTT Docomo, Inc., "TR 38.804 v0.5.1 on Study on New Radio Access Technology; Radio Interface Protocol Aspects" 3GPP TSG-RAN WG2 #97, R2-1700730, Agenda Item 10.1, Athens, Greece, Feb. 13-17, 2017, pp. 1-51.

Samsung, "General considerations on design principles of data transmission in inactive," 3GPP TSG-RAN WG2, Jan. 2017 NR Ad-hoc Meeting, R2-1700367, Agenda Item 3.2.2.2, Spokane, USA, Jan. 17-19, 2017, 3 pages.

Sony, "Discussions on 2 Steps RACH Procedure," 3GPP TSG RAN WG2 Meeting, AH_NR Meeting, R1-1700471, Agenda Item 3.2.1.4, Spokane, USA, Jan. 17-19, 2017, 5 pages.

Samsung, "Comparison between active and inactive state for small data transmission from energy efficiency perspective", 3GPP TSG-RAN WG2 Meeting #95-BIS, R2-166538, Kaohsiung, Taiwan, Oct. 10-14, 2016, 5 pages.

Huawei, "Summary of email discussion: [95#28][NR] Data transmission in 'new state'", 3GPP TSG-RAN WG2 #95bis, R2-166986, Kaohsiung, Oct. 10-14, 2016, 17 pages.

Huawei, Hisilicon, "Infrequent small data transmission in NR", 3GPP TSG-RAN WG2 Meeting #95bis, R2-166997, Kaohsiung, Oct. 10-14, 2016, 3 pages.

Nokia et al., "Data transmission in Inactive", 3GPP TSG-RAN WG2 Meeting #96 , R2-167706, Nov. 14-18, 2016, 7 pages, Reno, USA.

\* cited by examiner

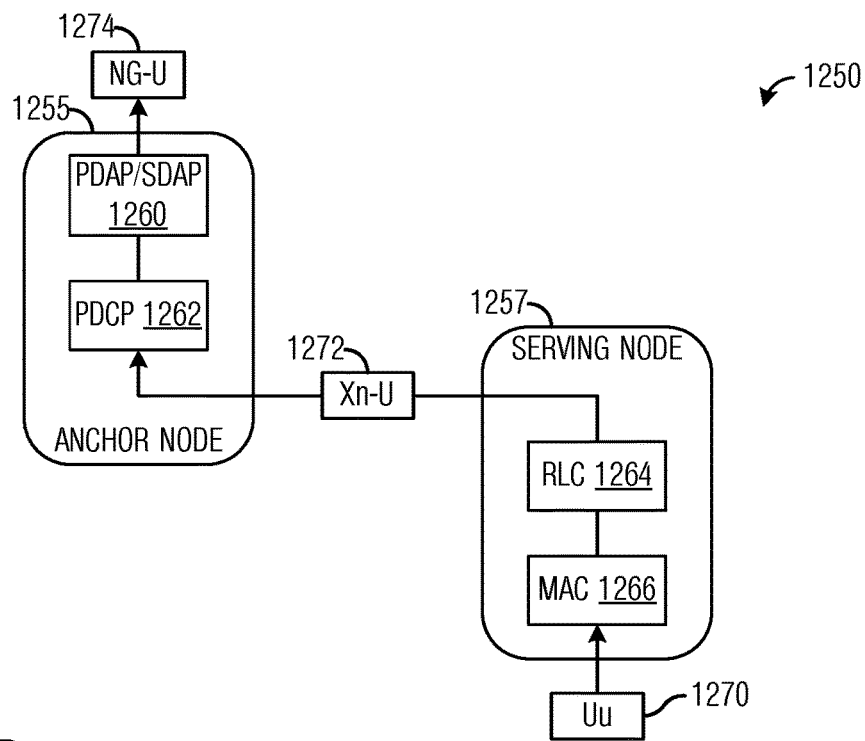
Fig. 12B
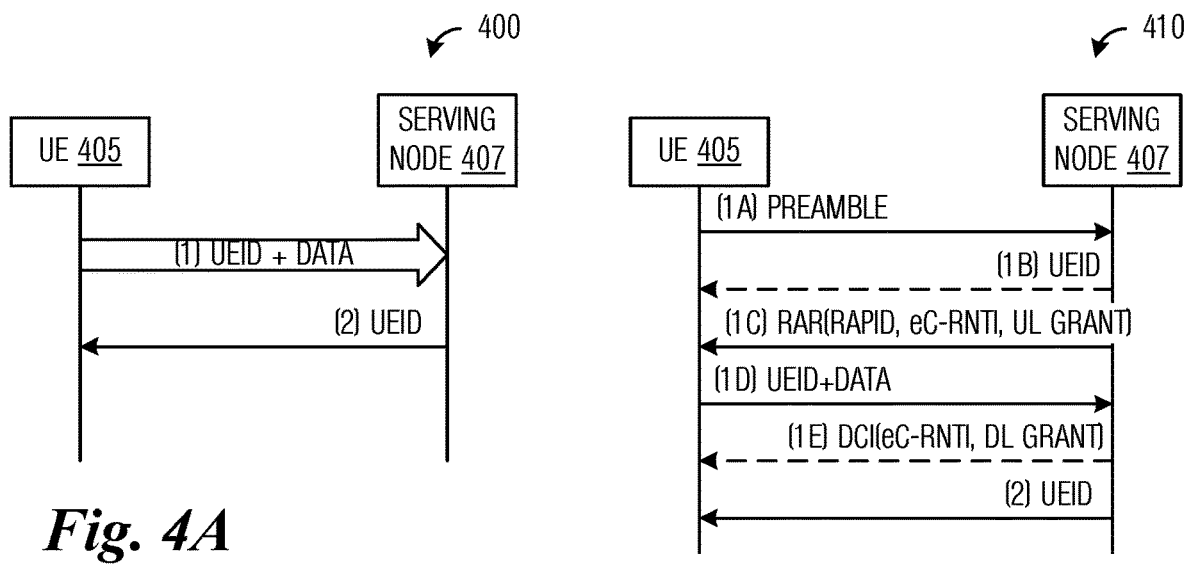
Fig. 4A
Fig. 4B

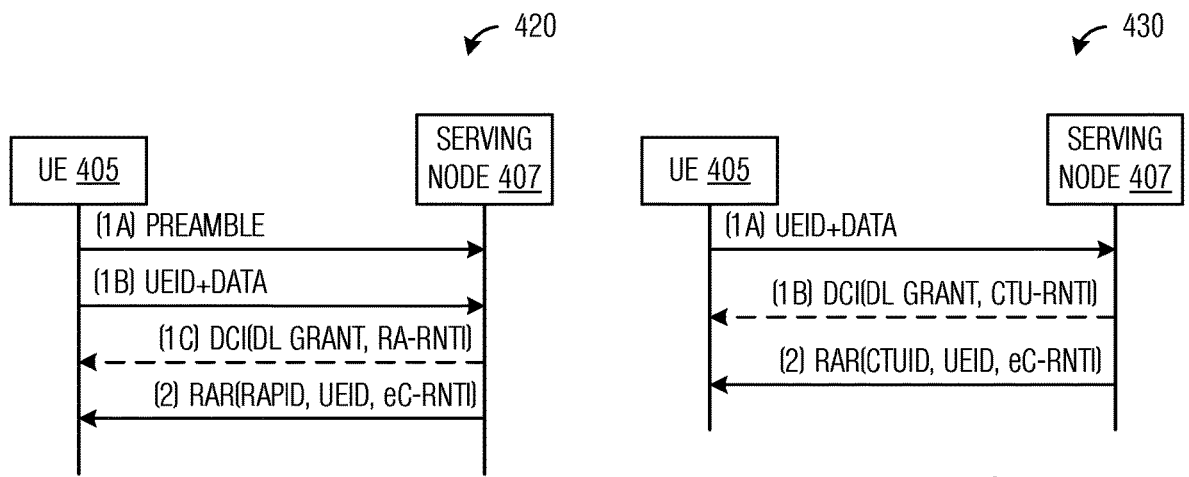
*Fig. 4C*
*Fig. 4D*
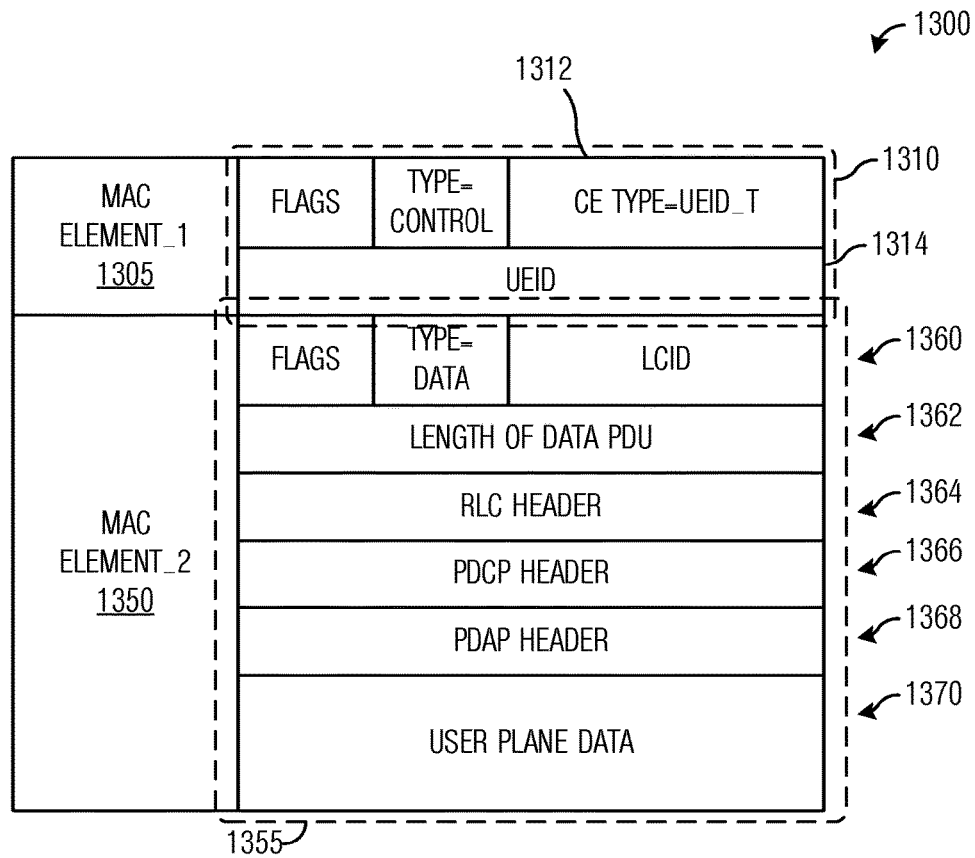
*Fig. 13*

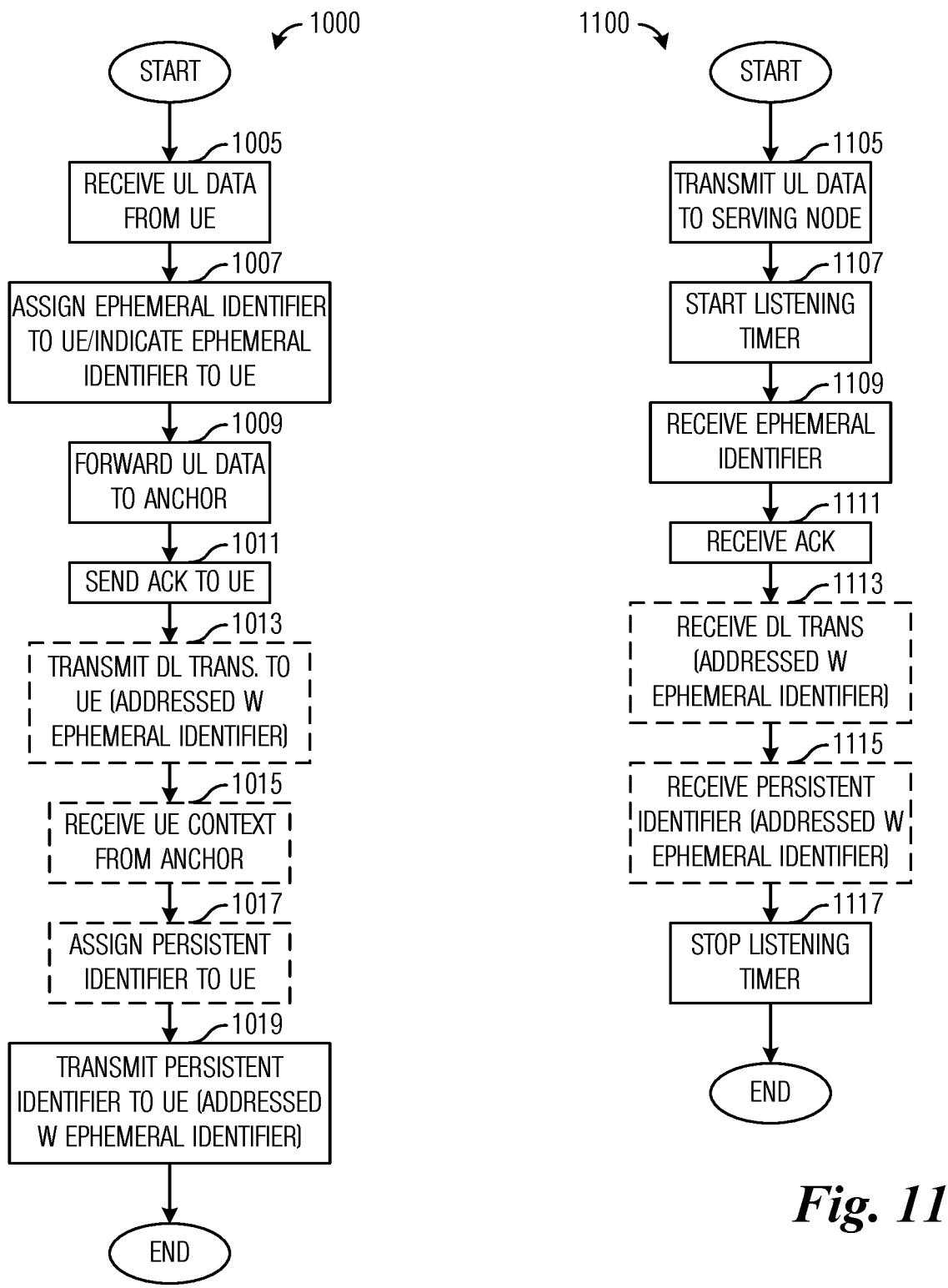

SYSTEM AND METHOD FOR USER EQUIPMENT IDENTIFICATION AND COMMUNICATIONS

This patent application is a continuation of U.S. patent application Ser. No. 15/586,687, entitled "System and Method for User Equipment Identification and Communications" filed on May 4, 2017, which claims the benefit of U.S. Provisional Application No. 62/458,241, filed on Feb. 13, 2017, entitled "System and Method for User Equipment Identification," both of which applications are hereby incorporated herein by reference.

TECHNICAL FIELD

The present invention relates generally to a system and method for digital communications, and, in particular embodiments, to a system and method for user equipment (UE) identification and communications in a wireless communications system.

BACKGROUND

In wireless systems, an INACTIVE mode of operation is characterized by a low duty cycle (similar to legacy IDLE state) but the user equipment (UE) context is maintained in the radio access network (RAN) in a manner similar to legacy CONNECTED state.

The INACTIVE mode can support small data transmissions in the uplink while the communications device remains in the INACTIVE mode. As an example, the INACTIVE mode is useful for a device with a need to communicate only a minimal amount of data, such as heartbeat or keep-alive packets generated by an application and for aperiodic reports from machine-type communications devices.

SUMMARY

Example embodiments provide a system and method for user equipment (UE) identification and communications.

In accordance with an example embodiment, a method for managing identities of user devices operating in an inactive mode is provided. The method includes receiving, by a serving device, a first uplink transmission including a user device identifier associated with a user device, transmitting, by the serving device, a first downlink transmission including an indication of an ephemeral identifier assigned to the user device, transmitting, by the serving device, a second downlink transmission including data associated with the ephemeral identifier, and discarding, by the serving device, the ephemeral identifier.

The first uplink transmission further includes user data. The method also includes receiving, by the serving device, a second uplink transmission associated with the ephemeral identifier. The ephemeral identifier comprises an ephemeral cell radio network temporary identifier (eC-RNTI).

The method also includes fetching, by the serving device, a user device context from an anchor device, transmitting, by the serving device, a third downlink transmission associated with the ephemeral identifier, wherein the third downlink transmission includes an assignment of a persistent identifier of the user device, and transmitting, by the serving device, a fourth downlink transmission associated with the persistent identifier. The third downlink transmission and the fourth downlink transmission are one and the same. Generating the persistent identifier includes one of promoting the ephemeral identifier to the persistent identifier, or deriving the persistent identifier in accordance with the user device context. The user device context is stored at the serving device after being fetched from the anchor device.

In accordance with an example embodiment, a method for operating a user device in an inactive mode is provided. The method includes transmitting, by the user device, a first uplink transmission including a user device identifier associated with the user device, receiving, by the user device, a first downlink transmission including an indication of an ephemeral identifier assigned to the user device, receiving, by the user device, a second downlink transmission including data associated with the ephemeral identifier, and discarding, by the user device, the ephemeral identifier.

The first uplink transmission further includes user data. The method also includes starting, by the user device, a listen timer after transmitting the first uplink transmission, wherein discarding the ephemeral identifier occurs after the listen timer expires. The method also includes starting, by the user device, a listen timer after transmitting the first uplink transmission, receiving, by the user device, a third downlink transmission associated with the ephemeral identifier, wherein the third downlink transmission includes an assignment of a persistent identifier, and stopping, by the user device, the listen timer. The method also includes deriving, by the user device, a security key in accordance with the third downlink transmission, verifying, by the user device, an integrity check of at least a portion of the third downlink transmission in accordance with the security key, and using, by the user device, the persistent identifier when the integrity check passes.

In accordance with an example embodiment, a serving device adapted to manage identities of user devices operating in an inactive mode is provided. The serving device includes a processor, and a computer readable storage medium storing programming for execution by the processor. The programming including instructions to configure the serving device to receive a first uplink transmission including a user device identifier associated with a user device, transmit a first downlink transmission including an indication of an ephemeral identifier assigned to the user device, transmit a second downlink transmission including data associated with the ephemeral identifier, and discard the ephemeral identifier.

The programming includes instructions to configure the serving device to receive a second uplink transmission associated with the ephemeral identifier. The programming includes instructions to configure the serving device to fetch a user device context from an anchor device, transmit a third downlink transmission associated with the ephemeral identifier, wherein the third downlink transmission includes an assignment of a persistent identifier of the user device, and transmit a fourth downlink transmission associated with the persistent identifier. The programming includes instructions to configure the serving device to one of promote the ephemeral identifier to the persistent identifier, or derive the persistent identifier in accordance with the user device context.

In accordance with an example embodiment, a user device adapted to operate in an inactive mode is provided. The user device includes a processor, and a computer readable storage medium storing programming for execution by the processor. The programming including instructions to configure the user device to transmit a first uplink transmission including a user device identifier associated with the user device, receive a first downlink transmission including an indication of an ephemeral identifier assigned to the user device, receive a second downlink transmission including data associated with the ephemeral identifier, and discard the ephemeral identifier.

The programming includes instructions to configure the user device to start a listen timer after the first uplink transmission is transmitted, wherein the ephemeral identifier is discarded after the listen timer expires. The programming includes instructions to configure the user device to start a listen timer after transmitting the first uplink transmission, receive a third downlink transmission associated with the ephemeral identifier, wherein the third downlink transmission includes an assignment of a persistent identifier, and stop the listen timer. The programming includes instructions to configure the user device to derive a security key in accordance with the third downlink transmission, verify an integrity check of at least a portion of the third downlink transmission in accordance with the security key, and use the persistent identifier when the integrity check passes.

Practice of the foregoing embodiments enables the handling of an identifier for a UE operating in the inactive mode that allows downlink messages transmitted over a radio link to be addressed to the UE, while maintaining the context of the UE at an anchor node within the network.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4A illustrates a diagram of messages exchanged and processing performed by devices participating in an uplink data transmission procedure, highlighting a baseline PHY independent uplink data transmission according to example embodiments described herein;

FIG. 4B illustrates a diagram of messages exchanged and processing performed by devices participating in an uplink data transmission procedure, highlighting a four-step random access procedure used in an uplink data transmission according to example embodiments described herein;

FIG. 4C illustrates a diagram of messages exchanged and processing performed by devices participating in an uplink data transmission procedure, highlighting a two-step random access procedure used in an uplink data transmission according to example embodiments described herein;

FIG. 4D illustrates a diagram of messages exchanged and processing performed by devices participating in an uplink data transmission procedure, highlighting a non-orthogonal multiple access (NOMA) grant-free procedure used in an uplink data transmission according to example embodiments described herein;

FIG. 10 illustrates a flow diagram of example operations occurring in a serving node participating in an uplink data transmission according to example embodiments described herein;

FIG. 11 illustrates a flow diagram of example operations occurring in a UE participating in an uplink data transmission according to example embodiments described herein;

FIG. 12B illustrates an example protocol stack model used while in the INACTIVE mode according to example embodiments described herein;

FIG. 13 illustrates an example uplink PDU according to example embodiments described herein;

DETAILED DESCRIPTION OF ILLUSTRATIVE EMBODIMENTS

The making and using of the present example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
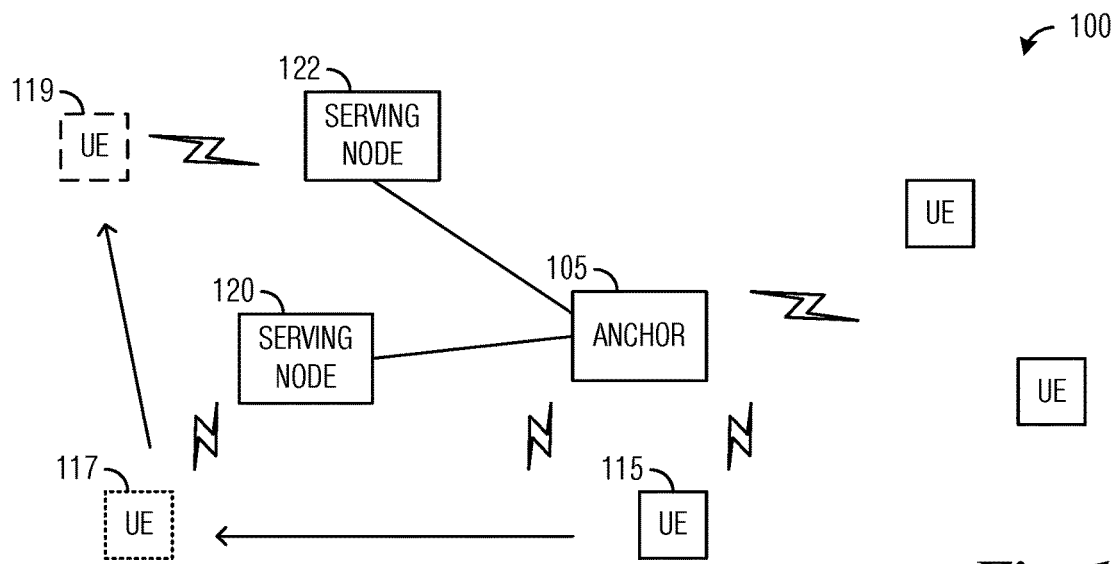
FIG. 1 illustrates an example wireless communications system according to example embodiments described herein.

FIG. 1 illustrates an example wireless communications system 100. Communications system 100 includes a plurality of network nodes, dubbed a Next Generation (NG) NodeBs (gNBs), and a plurality of UEs. Some of the gNBs operate as anchor nodes that maintain the context of one or more UEs that are operating in an INACTIVE mode, while other gNBs operate as serving nodes that may not have the context for INACTIVE UEs operating within their coverage area. As an illustrative example, gNB 105 operates as an anchor for UE 115 (referred to herein as anchor 105), but as UE 115 moves about and exits the coverage of anchor 105 and enters the coverage of gNB 120 (where UE 115 is now referred to as UE 117 to prevent confusion), gNB 120 becomes a serving node (or serving gNB) for UE 110 (referred to herein as serving node 120), while gNB 105 continues to operate as an anchor for UE 117. Similarly, as UE 117 continues to move and exits the coverage of serving node 120 and enters the coverage of gNB 122 (where UE 117 is now referred to as UE 119 to prevent confusion), gNB 122 becomes a serving node for UE 119 (referred to herein as serving node 122), while gNB 105 continues to operate as an anchor for UE 119. gNBs may also be commonly referred to as nodes, evolved NodeBs (eNBs), base stations, NodeBs, master eNBs (MeNBs), secondary eNBs (SeNBs), master gNBs (MgNBs), secondary gNBs (SgNBs), remote radio heads, access points, access nodes, access controllers, mobility anchors, and the like, while UEs may also be commonly referred to as mobiles, mobile stations, terminals, subscribers, users, stations, and the like. While it is understood that communications systems may employ multiple gNBs capable of communicating with a number of UEs, only three gNBs, and three UEs are illustrated for simplicity. An INACTIVE mode may refer to a designated UE operational state such as RRC_INACTIVE in a fifth generation (5G) New Radio (NR) system, a suspended mode of operation within another state such as RRC_CONNECTED in a Third Generation Partnership Project (3GPP) Long Term Evolution (LTE) system, and the like.

When a UE operating in the INACTIVE mode has a small amount of data to transmit in the uplink, the UE may perform a random access procedure (commonly referred to as a RACH procedure) to obtain network resources to transmit the data, or the UE may attempt a grant-free transmission of the data. Grant-free transmission involves a transmission by a device using network resources that are not dedicated to the device to make the transmission. Grant-free transmission is also commonly referred to as contention-based transmission. In a conventional random access procedure such as that used in a 3GPP LTE system, the UE selects a random access preamble and transmits the random access preamble to a serving node; and if the serving node successfully receives the random access preamble and has network resources to allocate, the serving node responds with a resource allocation for the UE to use for a subsequent uplink transmission of the data. In the grant-free transmission, the UE simply transmits the data on network resources designated for grant-free transmission without having to transmit a request; and if there is no collision with another grant-free transmission, the data may be successfully received by the node.

Using either technique for transmitting the data, the uplink data transmission may need to be acknowledged at Layer 2 to ensure reliable delivery over-the-air. Additionally, the uplink data transmission may also be used to generate a response from the application layer resulting in downlink data transmission to the UE. Therefore, the UE may need to remain available while in the INACTIVE mode to periodically monitor downlink channels after transmitting the uplink data.

As discussed above, a UE that is in the INACTIVE mode may be served by a node (referred to herein as the serving node) while its UE context is stored at a different node (referred to herein as the anchor node). However, the UE context may be needed for executing uplink data transmission procedures at a serving node, therefore, either the UE context may be fetched from the anchor node and provided to the serving node or the uplink data packets may be routed to the anchor node.

It may be advantageous to route the uplink data packets to the anchor node for a variety of reasons, including:

The UE context fetch may require a subsequent security key change, which adds significant latency and overhead. In the case of a grant-free transmission, the UE would need to derive the new security key before transmitting the uplink data. However the UE may not have access to all of the parameters needed for a new key derivation, e.g., the next-hop chaining count (NCC) which may result in a need for specialized security procedures in the INACTIVE mode. The additional processing required in the UE to update the security context results in further battery consumption, which is a situation that the INACTIVE mode tries to avoid.

The UE context fetch may require a path switch procedure between the serving node and the core network (CN), which adds additional latency and overhead. The path switch procedure resembles a handover procedure from the perspective of the CN.

The UE context fetch between serving and anchor nodes requires an exchange of messages over a backhaul network which also introduces additional latency.

Furthermore, due to the mobility of the UE, a different node may subsequently become the serving node. Therefore, multiple UE context fetches may be needed, compounding the foregoing concerns.

Although the INACTIVE mode discussion presented herein focuses on the RRC_INACTIVE state in a 5G/NR system, the example embodiments presented herein are also applicable to 5G/NR RRC_CONNECTED state when the UE in the RRC_CONNECTED state operates in a suspended mode, e.g., when the UE operates without dedicated radio resources and the UE context is stored at a node that may be different from the serving node. Similarly, the example embodiments presented herein are also applicable to 3GPP LTE light connection mode, as well as other modes of operation where a device is operating in a suspended mode. Therefore, the focus on the RRC_INACTIVE state should not be construed as being limiting to either the scope or the spirit of the example embodiments.

Figure 2:
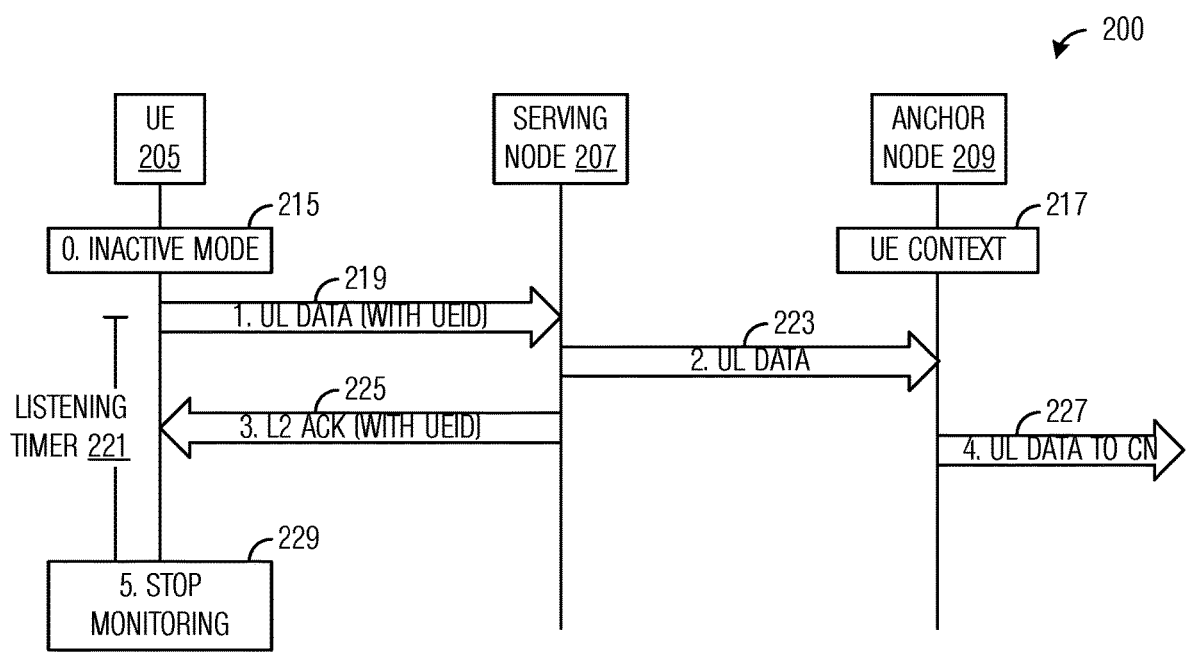
FIG. 2 illustrates a diagram of messages exchanged and processing performed by devices participating in an uplink data transmission procedure while in the INACTIVE mode.

FIG. 2 illustrates a diagram 200 of messages exchanged and processing performed by devices participating in an uplink data transmission procedure using grant-free transmission. Diagram 200 displays messages exchanged and processing performed by a UE 205, a serving node 207, and an anchor node 209. The uplink data transmission procedure shown in FIG. 2 uses grant-free transmission. Uplink data transmission using either a four-step RACH procedure or a two-step RACH procedure instead are described further in FIGS. 4A-4D.

The grant-free uplink data transmission procedure begins with UE 205 in an INACTIVE mode (block 215) and the UE context stored at anchor node 209 (block 217). UE 205 transmits uplink data on resources designated for grant-free transmission (event 219). The transmission of the uplink data also includes a UE identifier (UEID). The UEID may be an identifier of various types, such as a C-RNTI, a C-RNTI plus additional information, a Resume ID or Short Resume ID, etc., which can be used to locate the UE's context in the network and/or perform contention resolution when transmissions from two different UEs collide over the air. As UE 205 transmits the uplink data, UE 205 also starts a listening timer (event 221). The listening timer keeps track of a period of time that UE 205 remains available to monitor the downlink channels for responses to the uplink data transmission. UE 205 may remain available continuously or intermittently during the duration of the listening timer, e.g., UE 205 may apply a discontinuous reception (DRX) cycle while the listening timer is active. Serving node 207 receives the uplink data and forwards the uplink data to anchor node 209 (event 223). Serving node 207 also responds to UE 205 with a Layer 2 acknowledgement (event 225). The Layer 2 acknowledgement includes the UEID to identify the intended recipient of the Layer 2 acknowledgement. The Layer 2 acknowledgement may also serve the purpose of contention resolution. Anchor node 209 forwards the uplink data to the CN (event 227). As shown in FIG. 2, the listening timer expires and UE 205 stops monitoring the downlink channels (block 229).

Figure 3:
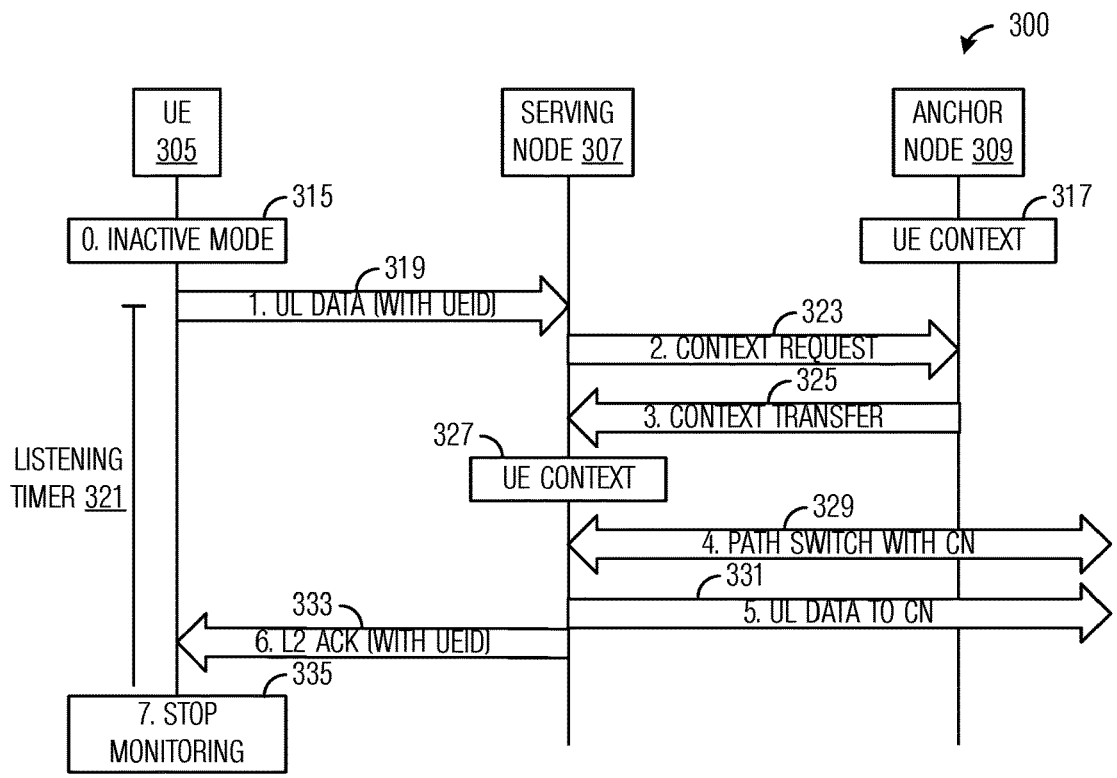
FIG. 3 illustrates a diagram of messages exchanged and processing performed by devices participating in an uplink data transmission procedure while in the INACTIVE mode with a UE context fetch.

FIG. 3 illustrates a diagram 300 of messages exchanged and processing performed by devices participating in an uplink data transmission procedure using grant-free transmission with a UE context fetch. Diagram 300 displays messages exchanged and processing performed by a UE 305, a serving node 307, and an anchor node 309. The uplink data transmission procedure shown in FIG. 3 uses grant-free transmission.

The uplink data transmission procedure begins with UE 305 in an INACTIVE mode (block 315) and the UE context stored at anchor node 309 (block 317). UE 305 transmits uplink data on resources designated for grant-free transmission (event 319). The transmission of the uplink data also includes a UE identifier (UEID). As UE 305 transmits the uplink data, UE 305 also starts a listening timer (event 321). Serving node 307 receives the uplink data and sends a UE context request to anchor node 309 (event 323). Serving node 307 identifies UE 305 and uses the UEID to determine which anchor node is housing the context for UE 305. Serving node 307 receives the UE context from anchor node 309 (event 325) and stores the UE context (block 327). Serving node 307 performs a path switch with the CN (event 329) and forwards the uplink data to the CN (event 331). Serving node 307 also responds to UE 305 with a Layer 2 acknowledgement (event 333). The Layer 2 acknowledgement may include the UEID to identify the intended recipient of the Layer 2 acknowledgement. As shown in FIG. 3, the listening timer expires and UE 305 stops monitoring the downlink channels (block 335). It is noted that messages and processing associated with security procedures, such as a key update, are not shown in FIG. 3.

Due to the reasons presented previously, maintaining the UE context at the anchor node reduces the overall latency incurred for forwarding the data packet to the CN. However, the UE context may be needed at the serving node to address certain messages to and from the UE. As an illustrative example, small data transmissions in the downlink to the UE, RRC signaling to configure the UE or to trigger the UE to transition to the RRC_CONNECTED state, and so on, are messages that need the UE context for generating and processing. It is noted that the UEID may not be suitable for addressing the UE in this sense due to restrictions of the air interface scheduling scheme, e.g., it may be only possible to address a UE by a C-RNTI valid in the serving cell, whereas the UEID may be a different type of identifier, or may be a C-RNTI valid only in the anchor node rather than the serving node.

In a situation wherein the uplink data transmissions are transmitted using a RACH procedure, a temporary identifier (such as a temporary cell radio network temporary identifier (tC-RNTI)) is assigned to the UE in the Msg2 of the 3GPP LTE four-step RACH procedure. However, the temporary C-RNTI expires and is discarded at the conclusion of the 3GPP LTE four-step RACH procedure. The temporary C-RNTI may be converted to a persistent identifier in the Msg4 of the four-step RACH procedure, but RRC signaling is required to do so and a context fetch is required to obtain the information needed to construct and validate an RRC message. Additionally, a temporary C-RNTI is typically not assigned to the UE if the uplink data is transmitted using a conventional grant-free transmission procedure.

Therefore, there is a need to define an approach that allows downlink messages to be addressed to the UE by the serving node, while avoiding a context fetch and maintaining the UE context at the anchor node.

According to an example embodiment, an ephemeral identifier, such as an ephemeral C-RNTI (eC-RNTI), is assigned to the UE in a downlink message after receiving an uplink data transmission, independent of the transmission method used for the uplink data transmission. The UE may monitor for transmissions assigned to the eC-RNTI on the downlink channels for the duration of a listening timer which is started after receiving the eC-RNTI from the serving node. After expiration of the listening timer, the eC-RNTI is discarded if it has not been made a persistent identifier.

The uplink data transmission procedure described previously in FIG. 2 and FIG. 3 is, for the most part, independent of PHY layer procedures. However, the mechanism for assigning the eRNTI will be dependent upon the PHY layer procedure selected for the transmission. FIG. 4A illustrates a diagram 400 of messages exchanged and processing performed by devices participating in an uplink data transmission procedure, highlighting a baseline PHY independent uplink data transmission. FIG. 4A illustrates messages exchanged and processing performed by a UE 405 and a serving node 407. In step 1 of FIG. 4A, UE 405 makes an uplink transmission to serving node 407 that includes the UEID of UE 405 and uplink data. In step 2 of FIG. 4A, serving node 407 makes a downlink transmission to UE 405 that includes the UEID of UE 405. This serves to acknowledge receipt of the uplink data by the serving node and may be used for contention resolution if uplink transmissions from multiple UEs collided in step 1.

FIG. 4B illustrates a diagram 410 of messages exchanged and processing performed by devices participating in an uplink data transmission procedure, highlighting a four-step random access procedure used in transmitting an uplink data transmission. FIG. 4C illustrates a diagram 420 of messages exchanged and processing performed by devices participating in an uplink data transmission procedure, highlighting a two-step random access procedure used in transmitting an uplink data transmission. FIG. 4D illustrates a diagram 430 of messages exchanged and processing performed by devices participating in an uplink data transmission procedure, highlighting a non-orthogonal multiple access (NOMA) grant-free procedure used in transmitting an uplink data transmission.

It is noted that in all cases (as shown in FIGS. 4A-4D, for example) following a successful uplink data transmission (step 1 of FIG. 4A, for example) to serving node 407, UE 405 has received from serving node 407 (in a downlink transmission, e.g., step 2 of FIG. 4A):
  a contention resolution message indicating that its UEID has been successfully decoded;
  an acknowledgement indicating that the short data PDU has been successfully received; and
  an eC-RNTI that UE 405 may use for subsequent contention-free transmissions with serving node 407. The eC-RNTI assignment may be valid beyond the duration of the INACTIVE mode uplink transmission procedure, for example, while a listening timer is active, and is explicitly or implicitly released when it is no longer needed, for example, when it reaches its expiry time or when UE 405 transitions to a connected state.

The manner in which UE 405 receives the eC-RNTI is different in each of the three PHY layer procedures, as described below.

Referring now to FIG. 4B, in the four-step random access procedure, the uplink data transmission follows the following:
  Step 1A of FIG. 4B: Uplink/preamble. UE 405 arbitrarily selects a random access preamble and transmits the preamble in a scheduled physical random access channel (PRACH). Other UEs may have independently selected the same preamble for transmission in the PRACH, resulting in potential contention.
  Step 1B of FIG. 4B: Downlink/downlink control information (DCI) (downlink grant, random access radio network temporary identifier (RA-RNTI)). Serving node 407 transmits a DL grant using a DCI encoded with a predefined random access RNTI (RA-RNTI) that points to a region in the physical downlink shared channel (PDSCH) that contains a random access response (RAR).
  Step 1C of FIG. 4B: Downlink/RAR (random access preamble identifier (RAPID), eC-RNTI, uplink grant). The RAR contains a list of random access preamble identifiers (RAPIDs) corresponding to the preambles detected by serving node 407 in the PRACH. For each RAPID, serving node 407 provides:
    a temporary C-RNTI assignment that is the eC-RNTI to be used by UE 405; and
    an uplink grant that may be used by UE 405 to transmit its uplink PDU.
  Step 1D of FIG. 4B: Uplink/UEID and data. Using the uplink grant, UE 405 transmits its assigned UEID and buffered data.
  Step 1E of FIG. 4B: Downlink/DCI (eC-RNTI, downlink grant). If serving node 407 successfully receives the uplink transmission (i.e., the CRC included in the received transmission is valid), serving node 407 transmits a downlink grant using a DCI encoded with the eC-RNTI assigned to UE 405 in step 1C of FIG. 4B.
  Step 2 of FIG. 4B: Downlink/UEID. When UE 405 receives the downlink transmission, it compares the identifier contained in the contention resolution identity MAC CE of the received message against its own UEID (i.e., the UEID transmitted in step 1D of FIG. 4B):
    if there is a match, the uplink transmission of the data is deemed successful; and
    if there is not a match, the uplink transmission of the data is deemed unsuccessful (e.g., another UE may have transmitted the same preamble in step 1A of FIG. 4B); UE 405 may attempt to retransmit the data by repeating this procedure at a later time.

Referring now to FIG. 4C, in the two-step random access procedure, the uplink data transmission follows the following:
  Step 1A of FIG. 4C: Uplink/preamble. UE 405 arbitrarily selects a random access preamble and transmits the preamble in a scheduled PRACH. Other UEs may have independently selected the same preamble for transmission in the PRACH, leading to potential contention.
  Step 1B of FIG. 4C: Uplink/UEID and data. Using physical uplink shared channel (PUSCH) resources associated with the selected preamble, UE 405 transmits its assigned UEID and buffered.
  Step 1C of FIG. 4C: Downlink/DCI (downlink grant, RA-RNTI). Serving node 407 transmits a downlink grant using a DCI encoded with a predefined RA-RNTI that points to a region in the PDSCH that contains a RAR.
  Step 2 of FIG. 4C: Downlink/(RAPID, UEID, eC-RNTI). The RAR contains a list of RAPIDs corresponding to the preambles detected by serving node 407 in the PRACH. For each RAPID, serving node 407 provides:
    a contention resolution identity containing the UEID received by serving node 407 in step 1b of FIG. 4C; and
    an eC-RNTI to be used by UE 405.
  When UE 405 receives the downlink transmission, it compares the identifier contained in the contention resolution identity against its own UEID (i.e., the UEID transmitted in step 1B of FIG. 4C):
    if there is a match, the uplink transmission of the data is deemed successful; and
    if there is not a match, the uplink transmission of the data is deemed unsuccessful (e.g., another UE may have transmitted the same preamble in step 1A of FIG. 4C); UE 405 may attempt to retransmit the data by repeating this procedure at a later time.

Referring now to FIG. 4D, in the non-orthogonal multiple access (NOMA) grant-free procedure, the uplink data transmission follows the following:
  Step 1A of FIG. 4D: Uplink/UEID and data. UE 405 uses a contention transmission unit (CTU) to transmit its UEID and data to serving node 407. The CTU that is used may have been arbitrarily selected by UE 405, or may have been previously assigned to UE 405, or may have been derived algorithmically by UE 405. Other UEs may have independently decided to transmit on the same CTU, leading to potential contention.
  Step 1B of FIG. 4D: Downlink/DCI (downlink grant, CTU-RNTI). If an asynchronous acknowledgement is used, serving node 407 transmits a downlink grant using a DCI encoded with a predefined contention transmission response (CTR) RNTI (CTU-RNTI) that points to a region in the PDSCH that contains a CTR. It is noted that this step is not required if CTR is a synchronous acknowledgement using a DL resource associated with the CTU.

Step 2 of FIG. 4D: Downlink/CTR (contention transmission unit identifier (CTUID), UEID, eC-RNTI). The CTR contains a list of CTUIDs corresponding to the CTUs where an uplink transmission was detected by serving node 407. If the UEID is a unique identifier, the CTUID in the CTR may not be required. For each CTUID, serving node 407 provides:
- a contention resolution identity containing the UEID received by serving node 407 in step is of FIG. 4D; and
- an eC-RNTI to be used by UE 405.

When UE 405 receives the downlink transmission, it compares the identifier contained in the contention resolution identity against its own UEID (i.e., the UEID transmitted in step 1A of FIG. 4D):
- if there is a match, the uplink transmission of the data is deemed successful; and
- if there is not a match, the uplink transmission of the data is deemed unsuccessful (e.g., another UE may have transmitted the same CTU in step 1A of FIG. 4D); UE 405 may attempt to retransmit the data by repeating this procedure at a later time.

As discussed previously, the UE is assigned an eC-RNTI following successful transmission of an uplink PDU and the eC-RNTI remains associated with the UE until one of the following events occurs:
- A time-out occurs. The time-out period is made known to the UE (and to the serving node) prior to the procedures described above. A timer is started at an instant subsequent to the transmission of the uplink PDU, e.g., when the downlink message containing the eC-RNTI assignment is received. The timer may be restarted whenever a DCI encoded with that eC-RNTI is received by the UE. When the timer expires, the eC-RNTI may be silently released by both the UE and the serving node—i.e. no explicit signaling is required to release the eC-RNTI in this case.
- Implicitly released by the UE. The eC-RNTI may be implicitly released due to an uplink signal transmitted by the UE. For example, if an uplink PDU does not include a radio link control (RLC) confirmation (e.g., $P_{RLC}=1$, as discussed below) or a PDCP confirmation ($P_{PDCP}=1$, as discussed below), then the eC-RNTI may be silently released.
- Explicitly released by the UE. The eC-RNTI may be explicitly released by the UE using one of the following mechanisms:
  - an uplink RRC message; and
  - a MAC CE included in an uplink PDU.
- Explicitly released by the serving node. The eC-RNTI may be explicitly released by the serving node using one of the following mechanisms:
  - a downlink RRC message;
  - a MAC CE included in a downlink PDU; and
  - an indication in a DCI encoded with the eC-RNTI.

Figure 5:
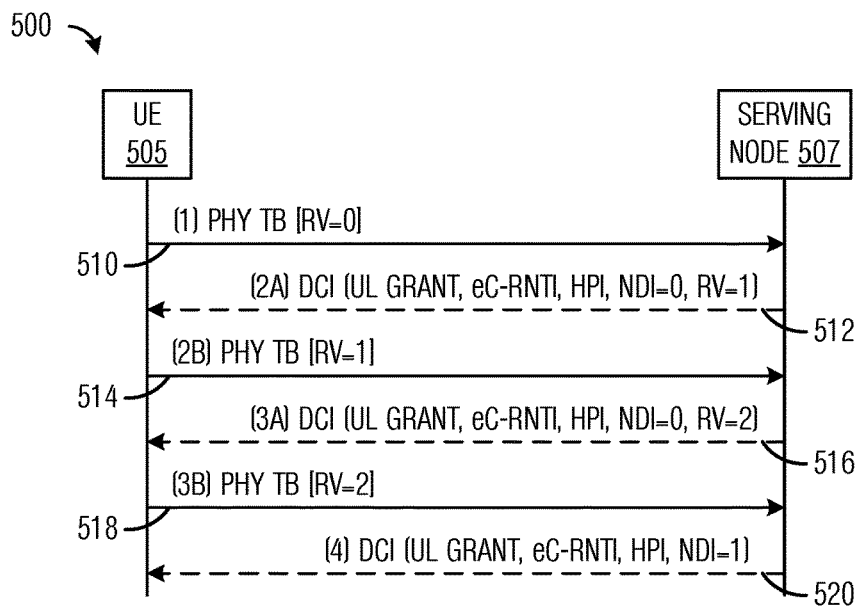
FIG. 5 illustrates a diagram of messages exchanged and processing performed by devices participating in an asynchronous hybrid automatic repeat requested procedure according to example embodiments described herein.

Using the assigned eC-RNTI, FIG. 5 illustrates a diagram 500 of messages exchanged and processing performed by devices participating in an asynchronous hybrid automatic repeat request (HARQ) procedure. Asynchronous HARQ may be used to support recovery from transmission errors following the assignment of an eC-RNTI to a UE 505 by a serving node 507. In a four-step RACH procedure, asynchronous HARQ may be used to recover from transmission errors involving the initial uplink transmission of UEID and data as well as for subsequent uplink and downlink transmissions. In a two-step RACH or NOMA grant-free procedure, asynchronous HARQ may only be used to recover from errors following transmission of (the initial segment of) UEID and data. In these procedures, it is possible that only a small amount of data may be transmitted in the radio resources allocated for the initial contention-based transmission and that larger amounts of data must be segmented for later transmission (as presented in detail below). The messages and processing associated with asynchronous HARQ operation include:

Event 510. UE 505 transmits the first instance of an uplink transport block (TB) which is implicitly deemed to be redundancy version zero (RV=0).

Event 512. If serving node 507 fails to decode the TB (e.g., there is a TB cyclic redundancy check (CRC) mismatch), serving node 507 transmits a DCI encoded with the eC-RNTI assigned to UE 505 that contains an uplink grant with the following information:
- The current HARQ process identifier (HPI). The HPI may be explicitly included by serving node 507 or may be inferred (e.g., from the transmission time interval (TTI) associated with the uplink grant). It is noted also that HPI may not be required if UE 505 is only allowed to have one active uplink HARQ process while in INACTIVE mode state.
- A new data indicator (NDI) indicating that a retransmission of the previous TB is required (e.g., NDI=0).
- The expected RV of the retransmission. The RV may be explicitly included by serving node 507 or may be inferred (e.g., if the RV is implicitly incremented with each transmission).

Event 514. UE 505 transmits the coded bits associated with the required RV of the TB.

Events 516 & 518. If necessary, serving node 507 requests a further retransmission using a DCI encoded with the eC-RNTI assigned to UE 505, and UE 505 retransmits with a different RV.

Event 520. This cycle of retransmission repeats until serving node 507 signals successful decoding of the TB by transmitting a DCI encoded with the eC-RNTI assigned to UE 505 that indicates a request for a new transport block (e.g., NDI=1).

Figure 6:
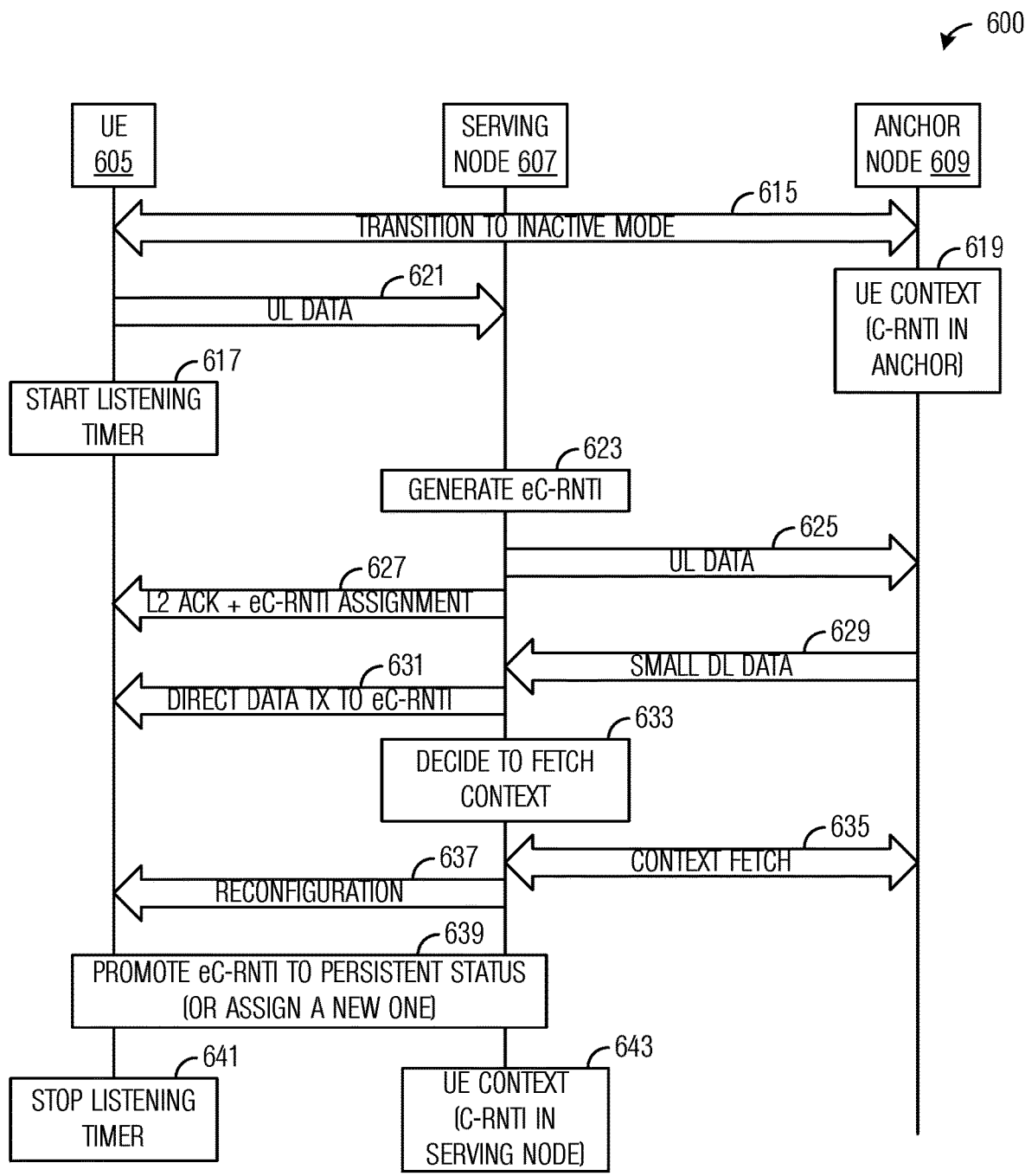
FIG. 6 illustrates a diagram of messages exchanged and processing performed by devices participating in an uplink data transmission procedure where an ephemeral identifier (eC-RNTI) is used to address downlink control messages that enable the uplink data transmission according to example embodiments described herein.

FIG. 6 illustrates a diagram 600 of messages exchanged and processing performed by devices participating in an uplink data transmission procedure where an eC-RNTI is used to address downlink data corresponding to the uplink data transmission. Diagram 600 displays messages exchanged and processing performed by a UE 605, a serving node 607, and an anchor node 609.

UE 605 and anchor node 609 exchange signaling to allow UE 605 to transition into the INACTIVE mode (event 615). The anchor node 609 stores the UE context, which may include the persistent C-RNTI of UE 605 allocated by the anchor node 609 (block 619). The uplink data transmission procedure begins when UE 605 transmits the uplink data to serving node 607 (event 621) and starts a listening timer (block 617). Serving node 607 generates an eC-RNTI for UE 605 (block 623) and forwards the uplink data to anchor node 609 (event 625). Serving node 607 sends a Layer 2 acknowledgement and the eC-RNTI, which has been assigned to UE 605, to UE 605 (event 627).

Serving node 607 receives a downlink data transmission from anchor node 609 (event 629). The downlink data transmission may be a response to the uplink data transmission from UE 605. Serving node 607 forwards the downlink data to a device identified by the eC-RNTI (i.e., UE 605) (event 631). If necessary, serving node 607 decides to fetch the UE context from anchor node 609 (block 633). Serving node 607 and anchor node 609 exchange messaging to fetch the UE context to serving node 607 (event 635). Serving node 607 sends a reconfiguration message to UE 605 (event 637). UE 605 and serving node 607 exchange messaging to promote the eC-RNTI to persistent C-RNTI status (block 639). Alternatively, a new persistent C-RNTI is assigned to UE 605 by serving node 607. UE 605 stops the listening timer associated with the eC-RNTI (block 641) and the UE context is stored at serving node 607 (block 543). The UE context stored at serving node 607 includes the persistent identifier, e.g., the persistent C-RNTI, of UE 605 assigned by the serving node 607 in block 639.

Figure 7A:
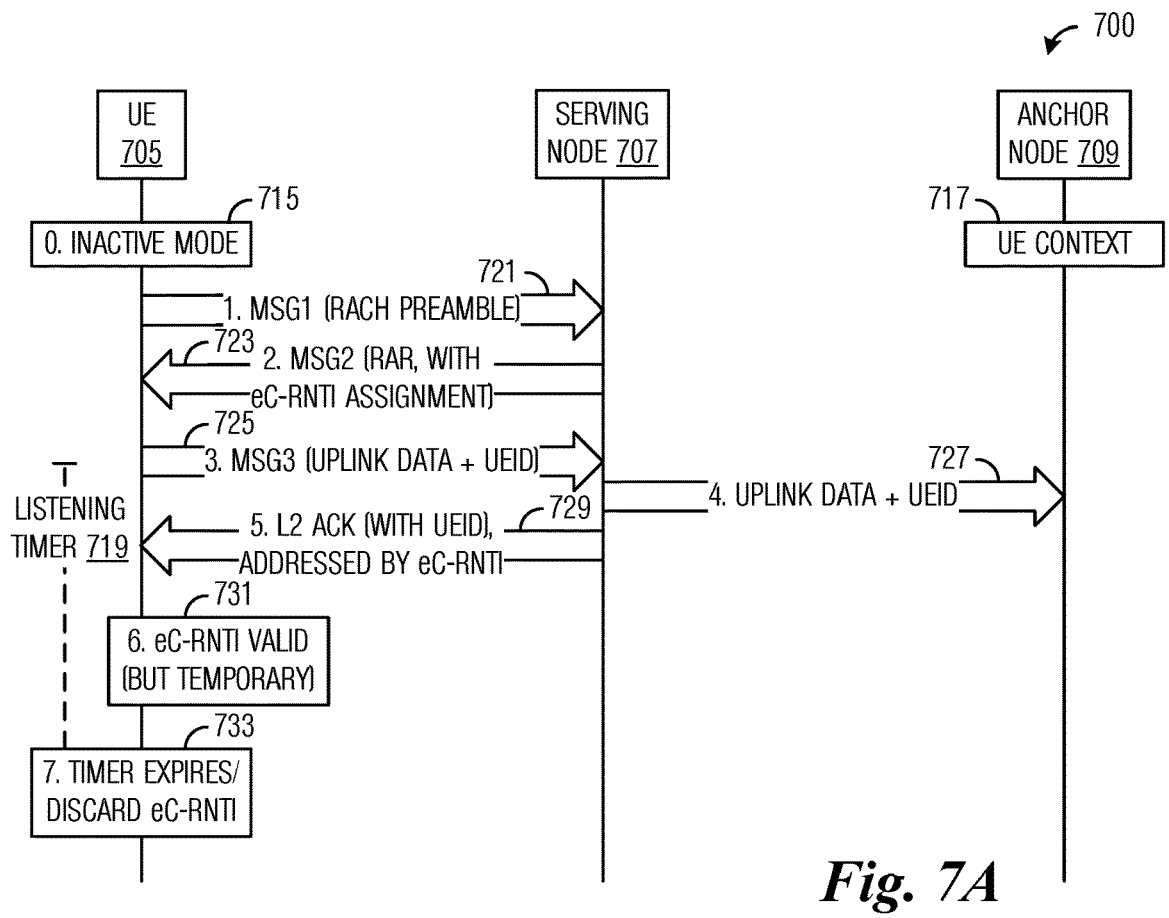
FIG. 7A illustrates a diagram of messages exchanged and processing performed by devices participating in an uplink data transmission procedure using an LTE RACH-based procedure with no subsequent transmission according to example embodiments described herein.

FIG. 7A illustrates a diagram 700 of messages exchanged and processing performed by devices participating in an uplink data transmission procedure using a 3GPP LTE four-step RACH procedure based transmission with no subsequent transmission. Diagram 700 displays messages exchanged and processing performed by a UE 705, a serving node 707, and an anchor node 709.

The uplink data transmission procedure begins with UE 705 in the INACTIVE mode (block 715) and the UE context stored at anchor node 709 (block 717). UE 705 has uplink data to transmit and initiates a RACH based procedure to obtain network resources to transmit the uplink data. UE 705 initiates the RACH based procedure by sending Msg1, which includes a RACH preamble, to serving node 707 (event 721). Serving node 707 sends Msg2, which comprises a random access response (RAR) with an eC-RNTI assignment, to UE 705 (event 723). UE 705 sends Msg3 with the uplink data and a UE identifier (e.g., UEID) to serving node 707 (event 725). UE 705 also starts a listening timer (event 719). Serving node 707 forwards the uplink data and UEID to anchor node 709 (event 727). Serving node 707 sends a Layer 2 acknowledgement with UEID and addressed to the eC-RNTI (UE 705) (event 729). UE 705 considers the eC-RNTI as a valid but temporary identifier (block 731). Later, the listening timer expires and the eC-RNTI is discarded (block 733).

Figure 7B:
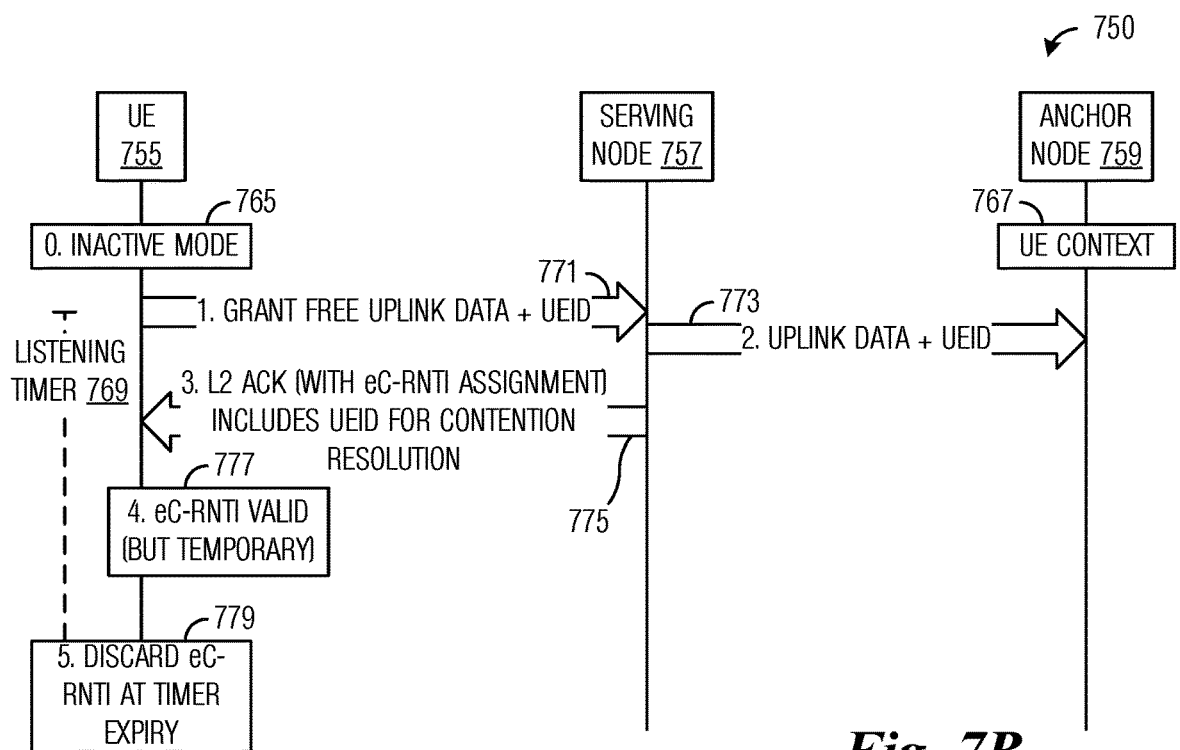
FIG. 7B illustrates a diagram of messages exchanged and processing performed by devices participating in an uplink data transmission procedure using a grant-free transmission with no subsequent transmission according to example embodiments described herein.

FIG. 7B illustrates a diagram 750 of messages exchanged and processing performed by devices participating in an uplink data transmission procedure using a grant-free based transmission with no subsequent transmission. Diagram 750 displays messages exchanged and processing performed by a UE 755, a serving node 757, and an anchor node 759.

The uplink data transmission procedure begins with UE 755 in the INACTIVE mode (block 765) and the UE context stored at anchor node 759 (block 767). UE 755 has uplink data to transmit and transmits the uplink data with a UEID to serving node 757 using a grant-free resource (event 771) and starts a listening timer (event 769). Serving node 757 forwards the uplink data and UEID to anchor node 759 (event 773). Serving node 757 sends a Layer 2 acknowledgement with UEID and an eC-RNTI assignment to UE 755 (event 775). The UEID may be used for contention resolution if needed. UE 755 considers the eC-RNTI as a valid but temporary identifier (block 777). Later, the listening timer expires and the eC-RNTI is discarded (block 779).

Figure 8:
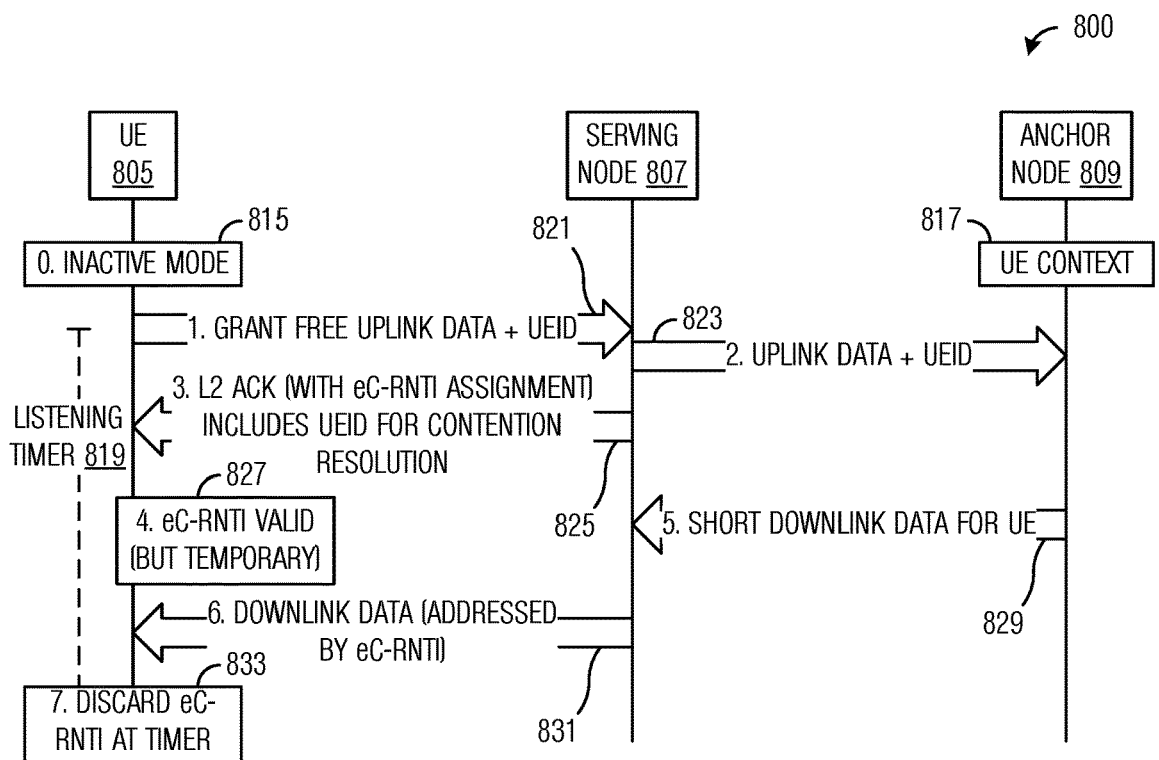
FIG. 8 illustrates a diagram of messages exchanged and processing performed by devices participating in an uplink data transmission procedure using a grant-free transmission with a subsequent downlink data transmission according to example embodiments described herein.

FIG. 8 illustrates a diagram 800 of messages exchanged and processing performed by devices participating in an uplink data transmission procedure using a grant-free based transmission with a subsequent downlink data transmission. Diagram 800 displays messages exchanged and processing performed by a UE 805, a serving node 807, and an anchor node 809.

The uplink data transmission procedure begins with UE 805 in the INACTIVE mode (block 815) and the UE context stored at anchor node 809 (block 817). UE 805 has uplink data to transmit and transmits the uplink data with a UEID to serving node 807 using a grant-free resource (event 821) and starts a listening timer (event 819). Serving node 807 forwards the uplink data and UEID to anchor node 809 (event 823). Serving node 807 sends a Layer 2 acknowledgement with UEID and an eC-RNTI assignment to UE 805 (event 825). The UEID may be used for contention resolution if needed. UE 805 considers the eC-RNTI as a valid but temporary identifier (block 827). Anchor node 809 forwards downlink data for UE 805 to serving node 807 (event 829). Serving node 807 sends the downlink data in a transmission addressed to eC-RNTI (UE 805) (event 831). Later, the listening timer expires and the eC-RNTI is discarded (block 833).

According to an example embodiment, the Layer 2 acknowledgement transmitted to the UE by the serving node may include an indicator or flag to immediately terminate the listening period. With the listening period terminated, the eC-RNTI would be discarded and the UE would return to its regularly scheduled DRX cycle. The inclusion of the indicator or flag that immediately terminates the listening period represents a network-side decision to indicate that no response is expected for the uplink data transmission and the network will not be fetching the UE context to the serving node. The network may make such a decision due to a number of situations, for example, the UE may have indicated in upper layer information suggesting that no response is expected, the network implementation may have decided that it will not fetch the UE context of the UE for implementation specific reasons, a highly mobile UE may be expected to relocate out of coverage of the serving node before the next downlink transmission (especially applicable in small cell and/or ultra-dense network (UDN) deployments where the dwell time per cell is small), and so on.

While a UE is listening, it is possible to cause the UE to transition from the INACTIVE mode into the CONNECTED state by sending a reconfiguration message, such as a RRC reconfiguration message, to the UE; the reconfiguration message is addressed to the UE using the eC-RNTI. This technique for causing the state transition is applicable to both RACH based and grant-free based uplink data transmission techniques because by the time that the UE is listening for downlink transmissions (after receiving the Layer 2 acknowledgment), both techniques are identical. The reconfiguration message may include a new persistent C-RNTI for the UE and uses existing signaling mechanisms, such as including the new persistent C-RNTI in a MAC CE or in an RRC message. Alternatively, the reconfiguration message promotes the eC-RNTI to persistent C-RNTI status, which may be achieved with an explicitly signaled instruction, such as a flag, or by omission (e.g., not including a new persistent C-RNTI but directing the UE to the CONNECTED state, which implicitly means to make the eC-RNTI persistent). The reconfiguration message may only take place after the UE context has been fetched from the anchor node. Once the UE receives the reconfiguration message, the UE stops (or deletes) the listening timer associated with the eC-RNTI and transitions to the CONNECTED state.

It is noted that fetching the UE context from the anchor node may require an update of security configuration, e.g., in order to derive a new key. Parameters needed to perform the security update may be included in the reconfiguration message. As an example, a NCC is included in the reconfiguration message. In such a situation, the reconfiguration message may be integrity protected using a new key and not ciphered. The integrity protection prevents giving the old key to the new serving node, which may be an undesirable security practice. The reconfiguration message is not ciphered because the serving node cannot encrypt with the old key and the UE cannot decrypt with the new key (at least until the UE has received the reconfiguration message). The integrity check may be similar to the procedure used to validate and apply a SecurityModeCommand in 3GPP LTE communications systems. Namely, the UE first applies the security configuration to generate a new key, then the UE checks the integrity fields with the new key. If the integrity check fails, the UE discards the new key and ignores the reconfiguration message, while if the integrity check passes, the UE continues operation with the new key.

Figure 9:
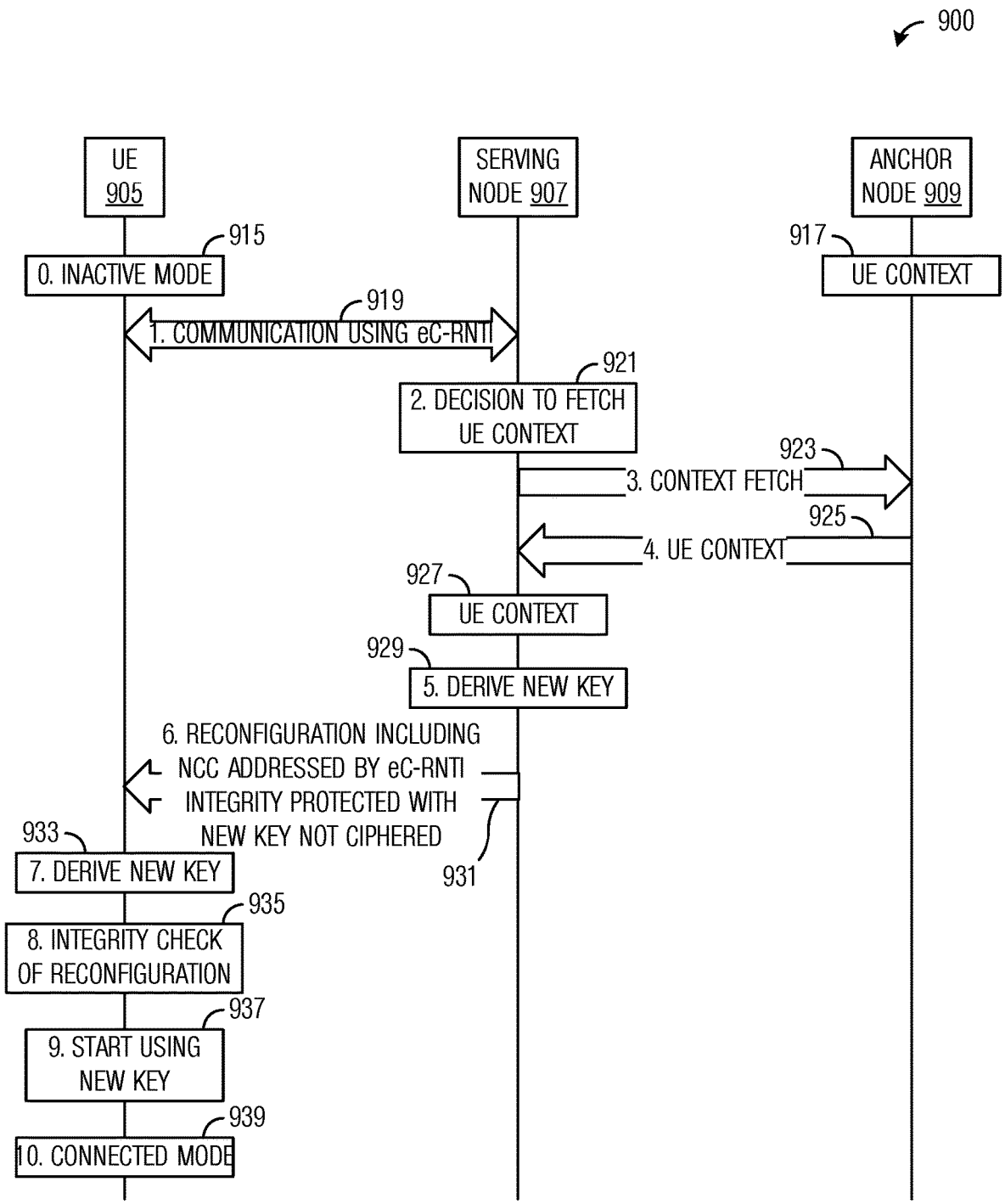
FIG. 9 illustrates a diagram of messages exchanged and processing performed by devices participating in security parameter management according to example embodiments described herein.

FIG. 9 illustrates a diagram 900 of messages exchanged and processing performed by devices participating in security parameter management. Diagram 900 displays messages exchanged and processing performed by a UE 905, a serving node 907, and an anchor node 909, as the devices participate in security parameter management.

The procedure begins with UE 905 in the INACTIVE mode (block 915) and the UE context stored at anchor node 909 (block 917). UE 905 and serving node 907 communicate using eC-RNTI, the ephemeral C-RNTI assigned to UE 905 (event 919). For example, the communication in event 919 may comprise an uplink and/or downlink data transfer using the eC-RNTI as previously described. Serving node 907 determines to fetch the UE context of UE 905 (block 921) and sends a context fetch to anchor node 909 (event 923). Anchor node 909 sends the UE context to serving node 907 (event 925), resulting in the UE context being stored at serving node 907 (block 927). Serving node 907 derives a new key from the UE context (block 929) and sends a reconfiguration message to UE 905 that includes a NCC (event 931). The reconfiguration message is addressed by eC-RNTI and is integrity protected using the new key, but the reconfiguration message is not ciphered. Alternatively, the new key may be derived by anchor node 909 and provided to serving node 907 along with the UE context in event 925.

UE 905 derives a new key using the information in the reconfiguration message (block 933) and performs an integrity check of the reconfiguration message (block 935) using the new key. FIG. 9 illustrates a scenario where the integrity check passes and UE 905 starts using the new key for subsequent transmissions (block 937). UE 905 also transitions to the CONNECTED state (block 939).

FIG. 10 illustrates a flow diagram of example operations 1000 occurring in a serving node participating in an uplink data transmission. Operations 1000 may be indicative of operations occurring in a serving node as the serving node participates in an uplink data transmission.

Operations 1000 begin with the serving node receiving an uplink data transmission from the UE (block 1005) that includes a UEID and uplink data. The serving node assigns an ephemeral identifier (e.g., eC-RNTI) to the UE and indicates the ephemeral identifier to the UE (block 1007). The serving node forwards the UEID and the uplink data to an anchor node (block 1009) and transmits an acknowledgement (e.g., a Layer 2 acknowledgement) to the UE (block ion). The serving node may transmit a downlink transmission to the UE (block 1013). The downlink transmission is addressed using the ephemeral identifier. The serving node optionally uses the UEID to fetch the UE context from the anchor node (block 1015). The serving node optionally assigns a persistent identifier to the UE (block 1017). As an example, the ephemeral identifier is promoted to a persistent identifier. Alternatively, the serving node generates a new persistent identifier for the UE, with the persistent identifier being generated in accordance with the UE context, for example. The serving node transmits the persistent identifier to the UE, with the transmission being addressed using the ephemeral identifier (block 1019).

FIG. 11 illustrates a flow diagram of example operations 1100 occurring in a UE participating in an uplink data transmission. Operations 1100 may be indicative of operations occurring in a UE as the UE participates in an uplink data transmission.

Operations 1100 begin with the UE transmitting a UEID and uplink data to a serving node (block 1105) and starting a listening timer (block 1107). The UE receives an ephemeral identifier (e.g., an eC-RNTI) from the serving node (block 1109). Alternatively, the UE may start the listening timer after receiving the ephemeral identifier from the serving node and not after transmitting the uplink data. The UE receives an acknowledgement (e.g., a Layer 2 acknowledgement) from the serving node (block 1111). The UE may receive a downlink transmission from the serving node (block 1113). The downlink transmission is addressed using the ephemeral identifier. The UE optionally receives a persistent identifier from the serving node (block 1115). The persistent identifier may be the ephemeral identifier promoted to a persistent identifier or the persistent identifier may be a newly generated identifier generated by the serving node (in accordance with a UE context fetched by the serving node, for example). The UE stops the listening timer (block 1117). The listening timer may be stopped once it expires, when the UE receives the persistent identifier, when the UE is directed to a connected RRC state, or when the UE is instructed to stop the listening timer (e.g., when the UE receives an indication that there will be no downlink response).

Figure 12A:
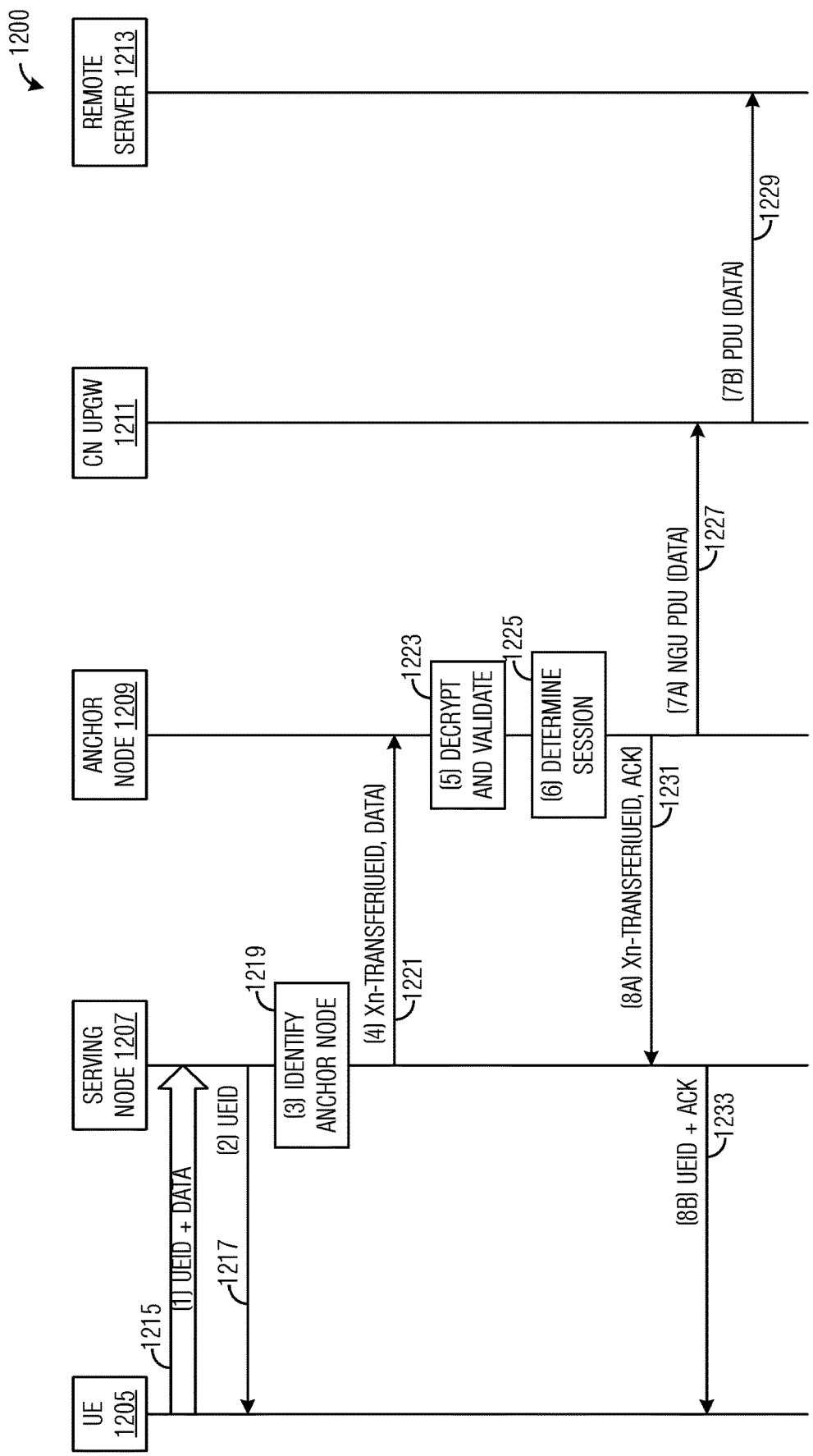
FIG. 12A illustrates a diagram of messages exchanged and processing performed by devices participating in an uplink data transmission procedure while in the INACTIVE mode without a context fetch according to example embodiments described herein.

FIG. 12A illustrates a diagram 1200 of messages exchanged and processing performed by devices participating in an uplink data transmission procedure without a context fetch. Message exchanged and processing occurring in diagram 1200 occur at a UE 1205, a serving node 1207, an anchor node 1209, a core network (CN) user plane gateway (UPGW) 1211, and a remote server 1213. Message exchanged and processing occurring in diagram 1200 includes:

(1) When a small uplink protocol data unit (PDU) is queued at the UE, the UE initiates a contention-based uplink transmission within its current serving node (event 1215). The message includes at least the following elements:
- a UE identifier (UEID) that uniquely identifies the UE within the radio access network (RAN) service area; and
- a short data PDU, destined for delivery to a remote server somewhere in the Internet-at-large.

(2) If the uplink transmission is successfully decoded, the serving node responds with a downlink contention resolution message (event 1217) that includes at least the UEID received in the previous uplink transmission (event 1215).

(3) The serving node uses information associated with, or embedded within, the UEID to identify an anchor node for this UE (block 1219):
- an anchor node maintains user plane (NG-U) connections to one or more CN user plane gateways (UPGW) that are used for exchanging UE-related traffic between the CN and RAN;
- an anchor node also maintains, or has access to, UE-specific context that is used by the RAN for supporting services provided to the UE by the mobile network operator (MNO). The context may include session information, data radio bearer (DRB) configuration, DRB parameters (e.g., sequence numbers) and cryptographic keying material (e.g., keys, counters).

In most cases, the anchor node will be a gNB that previously served the UE, however it may be some other network node or cluster of nodes (e.g., user plane forwarding nodes and control plane signaling nodes).

(4) The serving node then forwards the short data PDU—as received from the UE—over an inter-node (Xn) network to the anchor node (event 1221). The short data PDU includes the logical channel identifier (LCID) and upper layer 2 protocol headers as well as an application layer packet. Upper layer 2 protocols may include one or more of packet data convergence protocol (PDCP), robust header compression protocol (RoHC), packet data adaptation protocol (PDAP) and service data adaptation protocol (SDAP). It is noted that SDAP and PDAP refer to the same protocol and may be used interchangeably.

(5) The anchor node validates and decrypts the received PDU using the stored UE context referenced by the UEID (block 1223).

(6) If the PDU is successfully validated, the anchor node determines the session associated with the PDU (based on the LCID/DRB selected by the UE for the uplink transmission) (block 1225).

(7) The anchor node encapsulates the application packet inside an NG-U tunnel packet and forwards the tunnel packet to the UPGW associated with the corresponding UE session (event 1227). The UPGW forwards the data to the remote server (event 1229).

(8) Optionally, the anchor node may send an acknowledgement to the UE, via the serving node, indicating successful receipt of the packet (events 1231 and 1233).

FIG. 12B illustrates an example INACTIVE mode protocol stack model 1250. INACTIVE mode protocol stack model 1250 may be based on the 3GPP LTE dual connectivity model. Model 1250 includes an anchor node 1255 and a serving node 1257. Anchor node 1255 and serving node 1257 are coupled to other entities via interfaces, including a radio link (Uu) 1270, Xn-U 1272, and NG-U 1274. In model 1250:

The upper layer 2 protocol entities, such as PDAP/SDAP 1260 and PDCP 1262, and their associated state machines are located in anchor node 1255;

The lower layer 2 protocol entities, such as RLC 1264, MAC 1266 and PHY, and their associated state machines are located in serving node 1257.

In contrast to the dual-connectivity model, the serving node for a UE operating in the INACTIVE mode may not be provided with a UE-specific context for managing transmissions over Uu 1270. In particular, serving node 1257 may not have:

configurations for radio bearers currently established for this UE (i.e., RLC configuration, PDCP configuration);
radio bearer state information (e.g., received PDU sequence numbers, transmitted PDU sequence numbers);
robust header compression state information (e.g., established flow contexts, flow sequence number);
cryptographic keying material (e.g., keys, counters) for this UE;
quality of service (QoS) information (e.g., authorized QoS profiles, PDAP/SDAP QoS flow to DRB mappings); and
session information (e.g., identity of UPGW, identity of access management function (AMF)).

The lack of radio link context information may imply that serving node 1257 must have procedures tailored for use in the INACTIVE mode.

FIG. 13 illustrates an example uplink PDU 1300. Uplink PDU 1300 is an example of a PDU transmitted in the uplink data transmission of event 1215. Uplink PDU 1300 includes at least two MAC elements—a first MAC element (MAC element_1) 1305 for the UEID and a second MAC element (MAC element_2) 1350 for the uplink data.

First MAC element 1305 comprises a MAC control element (CE) 1310 that includes the following fields:
a. A MAC element header field 1312 indicating that MAC CE 1310 is a Control element of type "ueID_t", where "ueID_t" is a predefined value; and
b. A UEID field 1314 containing a UEID assigned to, or derived by, the UE for use in the INACTIVE mode operations (described in greater detail below).

The inclusion of this type of MAC CE indicates to the serving node that the UE has initiated an uplink data transmission while in the INACTIVE mode.

Second MAC element 1350 comprises a MAC data element 1355 that may include one or more of the following fields:

A MAC element header 1360 indicating that this is a data element; MAC element header 1360 also includes the LCID associated with the DRB selected by the UE for conveying the user plane data over the uplink;
A length field 1362 indicating the number of octets within the MAC data element;
An RLC header 1364, as described below;
A PDCP header 1366, as described below;
A PDAP/SDAP header 1368, as described below; and
User plane data 1370, containing information destined for a remote server connected to the Internet-at-large.

It is noted that other MAC control elements may also be included as required, such as a buffer status report (BSR), for example.

Figure 14:
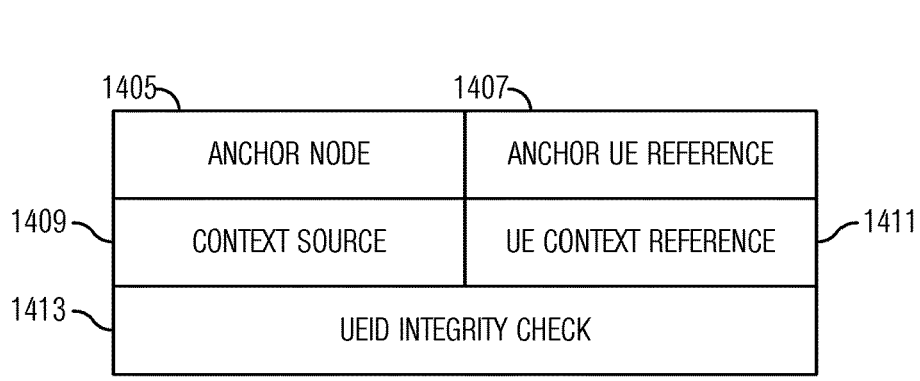
FIG. 14 illustrates an example MAC CE including a UEID according to example embodiments described herein.

FIG. 14 illustrates an example UEID 1400 contained in a UEID field of a MAC CE. UEID 1400 may be contained in a UEID field, such as UEID field 1314, for example, of a MAC CE, such as MAC CE 1310. UEID 1400 includes one or more of the following fields:

An anchor node reference. This field identifies the network node (field 1405) acting as the user plane anchor for the UE and a reference to the UE connectivity information (field 1407) maintained by the anchor node (e.g., the UPGWs assigned to the UE).
A context source reference. This field identifies the network node (field 1409) that stores the context information associated with the UE and a reference to the UE context information (field 1411) maintained by this node (e.g., configuration parameters, protocol state parameters).
A UEID integrity check 1413. This field contains an integrity check computed over the other fields of the UEID using a particular cryptographic key and algorithm. Any network node computing the integrity check value, including the UE, must have access to the pre-determined cryptographic key and algorithm. UEID integrity check field 1413 may or may not be included in the UEID depending, for example, on local public land mobile network (PLMN) policies.

UEID 1400 should contain an anchor node reference (fields 1405 and 1407) and may contain a context source reference (fields 1409 and 1411).

UL PDUs received by the serving node may be forwarded to the anchor node identified by field 1405 where the UE will be identified by field 1407. In an example embodiment, the anchor node may be a previous serving node that is now acting as an anchor node. In another example embodiment, the anchor node may be a mobility anchor that is serving one or more nodes within a RAN.

If necessary, the UE context may be retrieved by the serving node from the context source identified by field 1409 where the UE will be identified by field 1411. In an example embodiment, the context source may be a previous serving node that is now acting as a context repository. In another example embodiment, the context source may be a data repository that is serving one or more nodes within a RAN.

If the context source (in fields 1409 and 1411) is not included in UEID 1300, the UE context may be retrieved by the serving node through the anchor node identified by field 1405 where the UE will be identified by field 1407.

As related to the assignment or derivation of UEID 1400, in one embodiment the anchor node reference (fields 1405 and 1407) and, optionally, the context source reference (fields 1409 and 1411) are provided to the UE by the anchor node (e.g., through RRC signaling) before the UE enters the INACTIVE mode. The UE treats these references as opaque bit strings that are stored by the UE and then included as required in subsequent INACTIVE mode procedures. In some embodiments, UEID integrity check 1413 is also provided to the UE. In this situation, the cryptographic key and algorithm may not be shared with the UE (e.g., they may be known only to the anchor node).

In other embodiments, UEID integrity check 1413 is computed by the UE prior to transmission of the uplink PDU using a pre-determined cryptographic key and algorithm.

In another embodiment, the anchor reference (fields 1405 and 1407) is derived by the UE using information provided to the UE while operating in a CONNECTED state at the anchor node. In this situation, UEID 1400 would not include a context source reference (fields 1409 and 1411). Autonomous derivation of the anchor reference (fields 1405 and 1407) allows the UE to transition from a CONNECTED state to an INACTIVE mode without the use of RRC signaling (e.g., upon expiration of an inactivity timer).

In some embodiments, the anchor node identifier (field 1405) may comprise information broadcast by a node (e.g., in a System Information Block) or provided through RRC signaling. In some embodiments, the anchor UE reference (field 1407) may comprise a persistent C-RNTI (aC-RNTI) assigned to the UE by the anchor node.

As discussed previously in FIG. 12B, RLC procedures are performed in the serving node. Because the serving node does not have access to the UE context and the associated RLC configuration, the serving node may deduce the intended RLC mode from the information contained in the RLC header of the uplink PDU.

Figure 15A:
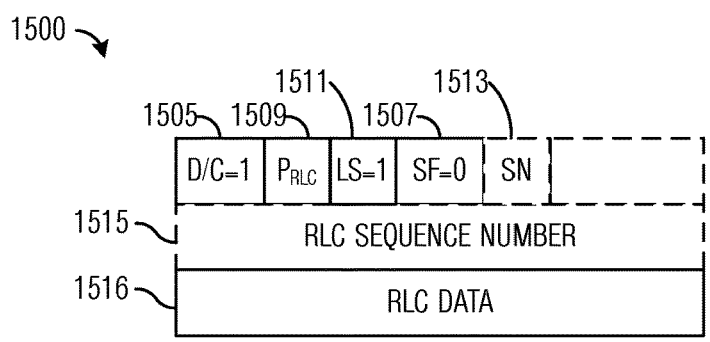
FIG. 15A illustrates an example RLC header without segmentation according to example embodiments described herein.

FIG. 15A illustrates an example RLC header 1500 without segmentation. If the uplink PDU can be completely contained within a single PHY transport block, then segmentation and reassembly is not required. In this situation, RLC header 1500 may include the following fields:

A data/control (e.g., D/C) flag 1505 indicating this is an RLC data PDU (e.g., D/C=1).

A segmentation (e.g., SF) flag 1507 indicating that this is a complete PDU and not a PDU segment (e.g., SF=0).

A poll (e.g., $P_{RLC}$) flag 1509 indicating whether the UE is requesting acknowledgement from the serving node that this PDU was received. If acknowledgement is requested (e.g., $P_{RLC}$=1), this implies an Acknowledged Mode (AM) of operation; if acknowledgement is not requested (e.g., $P_{RLC}$=0), this implies an Unacknowledged Mode (UM) of operation.

A last segment (e.g., LS) flag 1511 indicating this is the last segment of the PDU (e.g., LS=1).

An RLC sequence number 1515 may be included but may not be required if the UE is only allowed to have one active uplink transmission while in the INACTIVE mode. In some embodiments, the existence of an optional RLC sequence number 1515 may be indicated by a sequence number (e.g., SN) flag 1513 in the RLC header (e.g., SN=1).

Figure 15B:
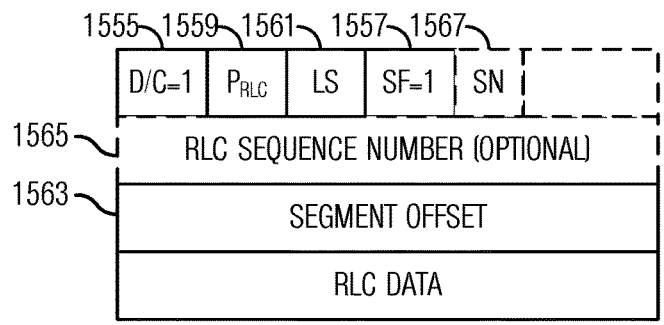
FIG. 15B illustrates an example RLC header with segmentation according to example embodiments described herein.

FIG. 15B illustrates an example RLC header 1550 with segmentation. If the uplink PDU cannot fit into a single PHY transport block, then segmentation and reassembly is required. In this situation, RLC header 1550 may include the following fields in each transmitted segment:

A data/control (e.g., D/C) flag 1555 indicating this is an RLC data PDU (e.g., D/C=1).

A segmentation (e.g., SF) flag 1557 indicating that this is a PDU segment (e.g., SF=1).

A poll (e.g., $P_{RLC}$) flag 1559 indicating whether the UE is requesting acknowledgement from the serving node that this PDU was received. If acknowledgement is requested (e.g., $P_{RLC}$=1), this implies an AM operation; if acknowledgement is not requested (e.g., $P_{RLC}$=0), this implies an UM operation.

A last segment (e.g., LS) flag 1561 indicating whether this is the last segment of the PDU (e.g., LS=1) or not (e.g., LS=0).

A segment offset 1563 identifying the location of this segment within the uplink PDU. It indicates the position of the first octet of the segment within the PDU and may indicate the position of the last octet of the segment within the PDU. In some embodiments, the segment offset field may not be required if this is the first segment of the PDU.

An RLC sequence number 1565 may be included but may not be required if the UE is only allowed to have one active uplink transmission while in the INACTIVE mode. In some embodiments, the existence of an optional RLC sequence number 1565 may be indicated by a sequence number (e.g., SN) flag 1567 in the RLC header (e.g., SN=1).

If the uplink PDU, such as one received in event 1215 of FIG. 12A (as discussed previously), indicates that this is the first segment of a user plane PDU (e.g., SF=1) and/or that an AM operation is requested (e.g., $P_{RLC}$=1), then the serving node initializes an RLC instance as follows:

associates the RLC instance with the LCID included in the MAC data element header;

if necessary, sets the RLC sequence number to the value received from the UE (e.g. in field 1565) or to a pre-determined value (e.g., zero) if the UE did not provide a sequence number; and if the uplink PDU is segmented (e.g., SF=1), allocates a reassembly buffer for this PDU and initializes a reassembly timer using a default time-out period.

If the uplink PDU was not segmented (e.g., SF=0), or if a segment is received indicating that it is the last segment (e.g., LS=1), or if the reassembly timer expires, then the serving node checks if an AM operation was requested by the UE:

if AM was requested (e.g., $P_{RLC}$=1), the serving node constructs an RLC status PDU (e.g., a PDU with D/C=0 indicating that it is a control PDU, and with the contents of the PDU comprising an indication of the RLC reception status) indicating whether (all segments of) the uplink PDU was successfully received (ACK) or not (NACK), and if not, which segments should be retransmitted by the UE.

the RLC status PDU is subsequently transmitted to the UE using a DCI that contains a downlink grant and is encoded with the eC-RNTI assigned to the UE.

As related to PDCP operation in anchor nodes, PDCP procedures may be performed in the anchor node if UE context is not transferred to the serving node. When an UL RLC PDU is successfully received from the UE, the serving node forwards the RLC data to the anchor node; the forwarded data includes at least the following information:

the UEID as received from the UE;
the LCID associated with the PDU; and
the PDCP PDU extracted from the data field 1516 of the received RLC PDU.

Figure 16A:
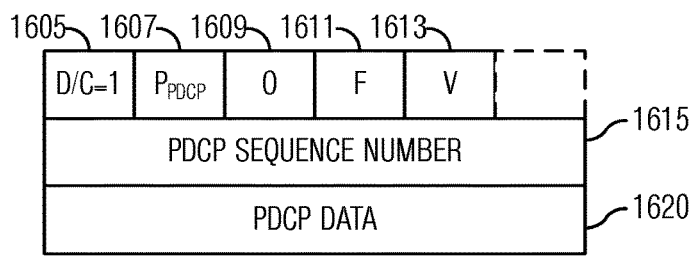
FIGS. 16A and 16B illustrate example PDCP data PDU headers without and with integrity check, respectively according to example embodiments described herein.
Figure 16B:
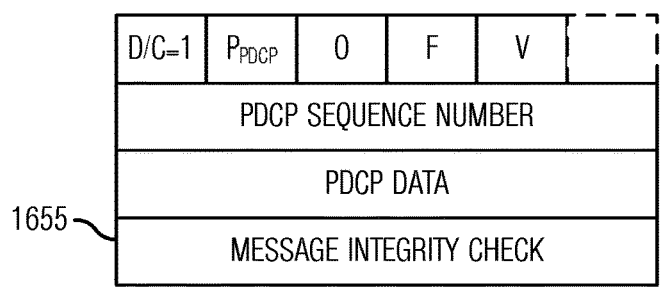

FIGS. 16A and 16B illustrate example PDCP data PDUs 1600 and 1650 without and with integrity check, respectively. PDCP data PDU header of PDCP data PDU 1600 includes the following fields (PDCP data PDU header of PDCP data PDU 1650 also includes the same fields):

A data/control (e.g., D/C) flag 1605 indicating this is an RLC data PDU (e.g., D/C=1).

A poll (e.g., $P_{PDCP}$) flag 1607 indicating a request for confirmation of successful receipt.

An out-of-order delivery (e.g., O) flag 1609 indicating a request for out-of-order delivery.

A flush data (e.g., F) flag 1611 indicating a request to flush data buffer.

A verify (e.g., V) flag 1613 indicating that a subsequent PDCP status PDU (such as one shown in FIG. 17B) should be integrity protected.

A PDCP sequence number 1615 containing the sequence number of PDCP data PDU 1600.

PDCP Data 1620 containing user plane information.

It is noted that PDCP data PDU 1650 is similar in structure to PDCP data PDU 1600 with the inclusion of message integrity check field 1655 that is computed over the contents of the PDCP PDU 1650.

When the anchor node receives the forwarded data containing the UEID, the UEID can be used to retrieve the context associated with the UE. In particular, the anchor node obtains:

the cryptographic parameters currently associated with the UE (e.g., cryptographic keys and algorithms);
RRC configuration parameters associated with the UE; and
the PDCP sequence number window currently associated with the LCID.

The anchor node may then proceed as follows:

If the UE has been configured to provide a UEID integrity check, the anchor node verifies that an integrity check, e.g., in UEID integrity check 1413, has been included in the UEID and that it is valid. If the UEID integrity check fails, the anchor node discards the received PDU and terminates the current procedure.

The anchor node verifies that the PDCP sequence number, e.g., in PDCP sequence number 1615, is valid (e.g., is within an allowed window for the LCID, as indicated in, for example, 3GPP Technical Specification (TS) 36.323, version 14.1.0). If the PDCP sequence number is not valid, the anchor node discards the received PDU and terminates the current procedure.

If the UE has been configured to include a message integrity check (for this LCID), the anchor node verifies that a message integrity check, e.g., in message integrity check 1655, has been included and that it is valid. If the message integrity check fails, the anchor node discards the received PDU and terminates the current procedure.

If the UE has been configured for user plane encryption (for this LCID), the anchor node decrypts the PDCP data, e.g., in PDCP data 1620, using the configured cryptographic parameters and the PDCP sequence number 1615 received with the PDU.

If the UE has been configured for robust header compression (for this LCID), the anchor node decompresses the header contained in the (decrypted) PDCP data using the current state of the header compression stream.

If the anchor node can reconstruct a valid data packet, the anchor node determines whether the data packet can be forwarded at this time:

if in-order delivery of PDCP PDUs has been disabled for this LCID, the anchor node immediately delivers the data packet to upper layers for forwarding to the CN.

if in-order delivery is enabled for this LCID but the UE has explicitly requested that the anchor node flush its data buffer (e.g., F=1 in field 1611), the anchor node immediately delivers the data packet to upper layers along with any uplink data packets currently buffered by the anchor node. Data packets should be delivered to upper layers in ascending order of the associated PDCP sequence number, e.g., in PDCP sequence number 1615.

if in-order delivery is enabled for this LCID but the UE has explicitly enabled out-of-order delivery of this PDCP PDU (e.g., O=1 in field 1609), the anchor node immediately delivers the data packet to upper layers.

otherwise, because in-order delivery is enabled for this LCID, the anchor node buffers the received data packet and initiates in-order delivery procedures.

The UE may request confirmation that the PDU was successfully received and processed by the network by using a poll flag (e.g., $P_{PDCP}$ in field 1607) in the PDCP PDU header. If the UE requests confirmation (e.g., $P_{PDCP}$=1), the anchor node constructs a PDCP status PDU (e.g., PDCP control PDUs shown FIGS. 17A and 17B) indicating, by sequence number, which PDCP data PDUs have been successfully received by the anchor node (ACK) and which have not (NACK).

It is noted that the UE is not required to request confirmation in every UL PDU. In some embodiments, a UE may not request confirmation in order to quickly return to a low energy state or to implicitly release an assigned eC-RNTI. The PDCP status PDU should include the status of all PDCP PDUs received by the anchor node since at least the last request for confirmation from the UE; the status window may be extended by the anchor node to guard against possible loss of intermediate PDCP status PDUs.

Figure 17A:
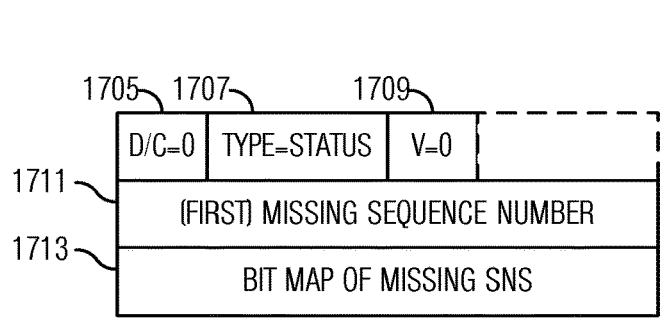
FIGS. 17A and 17B illustrate PDCP control PDUs with status information, without message integrity check and with message integrity check, respectively according to example embodiments described herein.
Figure 17B:
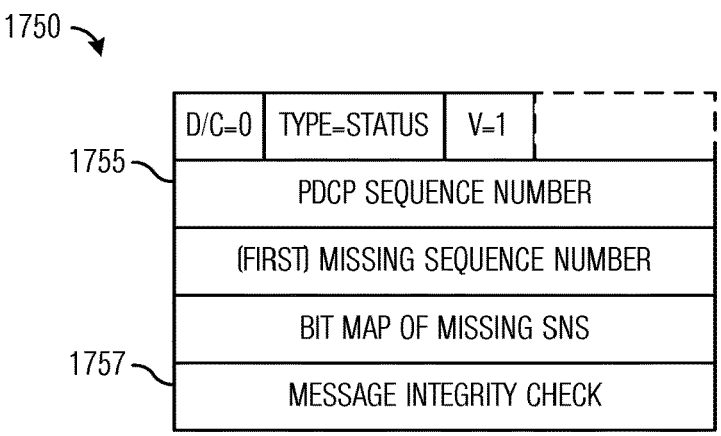

FIGS. 17A and 17B illustrate PDCP control PDUs 1700 and 1750 with status information, without message integrity check and with message integrity check, respectively. PDCP control PDUs 1700 and 1750 are also referred to as PDCP status PDUs. The PDCP status PDU may be subsequently transmitted to the UE via a serving node. Transmission to the UE may utilize a downlink grant DCI encoded with the eC-RNTI if it has not been discarded (e.g., if the listening timer has not expired).

PDCP control PDU 1700 may include the following fields:

A data/control (e.g., D/C) flag 1705 indicating this is a control PDU (e.g., D/C=0).

A type field 1707 indicating this is status PDU.

A verification (e.g., V) flag 1709 indicating that an integrity check field has been included (e.g., V=1) or no integrity check field has been included (e.g., V=0).

A missing sequence number field 1711 includes a first missing sequence number.

A bit map of missing sequence numbers field 1713 includes a bit map of missing sequence numbers.

It is noted that PDCP control PDU 1750 is similar in structure to PDCP control PDU 1700 with the inclusion of a PDCP data PDU sequence number field 1755 and a message integrity check field 1757 that is computed over the contents of the status PDU. PDCP data PDU sequence number field 1755 refers to a sequence number of a PDCP data PDU (e.g., in PDCP sequence number 1615 of PDCP data PDU 1600) where poll flag 1607 was set (e.g. $P_{PDCP}=1$) and verify flag 1613 was set (e.g., V=1) to request a verified PDCP status. In some embodiments, PDCP may be configured to always provide a PDCP status message integrity check 1757.

Figure 18:
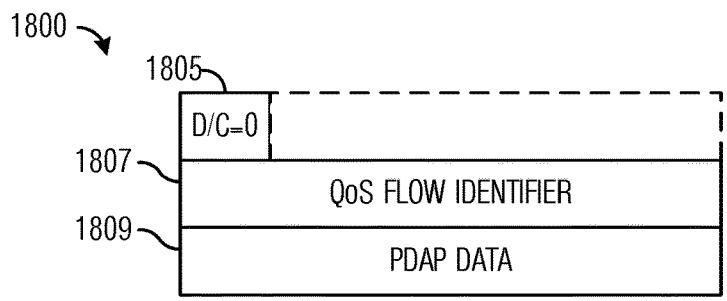
FIG. 18 illustrates an example PDAP/SDAP data PDU according to example embodiments described herein.

As related to PDAP/SDAP operations in anchor nodes, the PDAP/SDAP procedures may be performed in the anchor node if UE context is not transferred to the serving node. If the PDU received by the anchor node includes a PDAP/SDAP Data PDU header, the QoS flow identifier associated with the user plane PDU will be used for subsequent PDAP/SDAP operations. If a PDAP/SDAP Data PDU header is not included in the received PDU, the QoS flow identifier is inferred from the LCID associated with the PDU. FIG. 18 illustrates an example PDAP/SDAP data PDU 1800. PDAP/SDAP data PDU 1800 may include a data/control (e.g., D/C) flag 1805 indicating this is a control PDU (e.g., D/C=0), a QoS flow identifier field 1807 comprising an identifier of a QoS flow associated with the user plane PDU used for subsequent PDAP/SDAP operations, and a PDAP/SDAP data field 1809 that includes PDAP/SDAP data.

Figure 19:
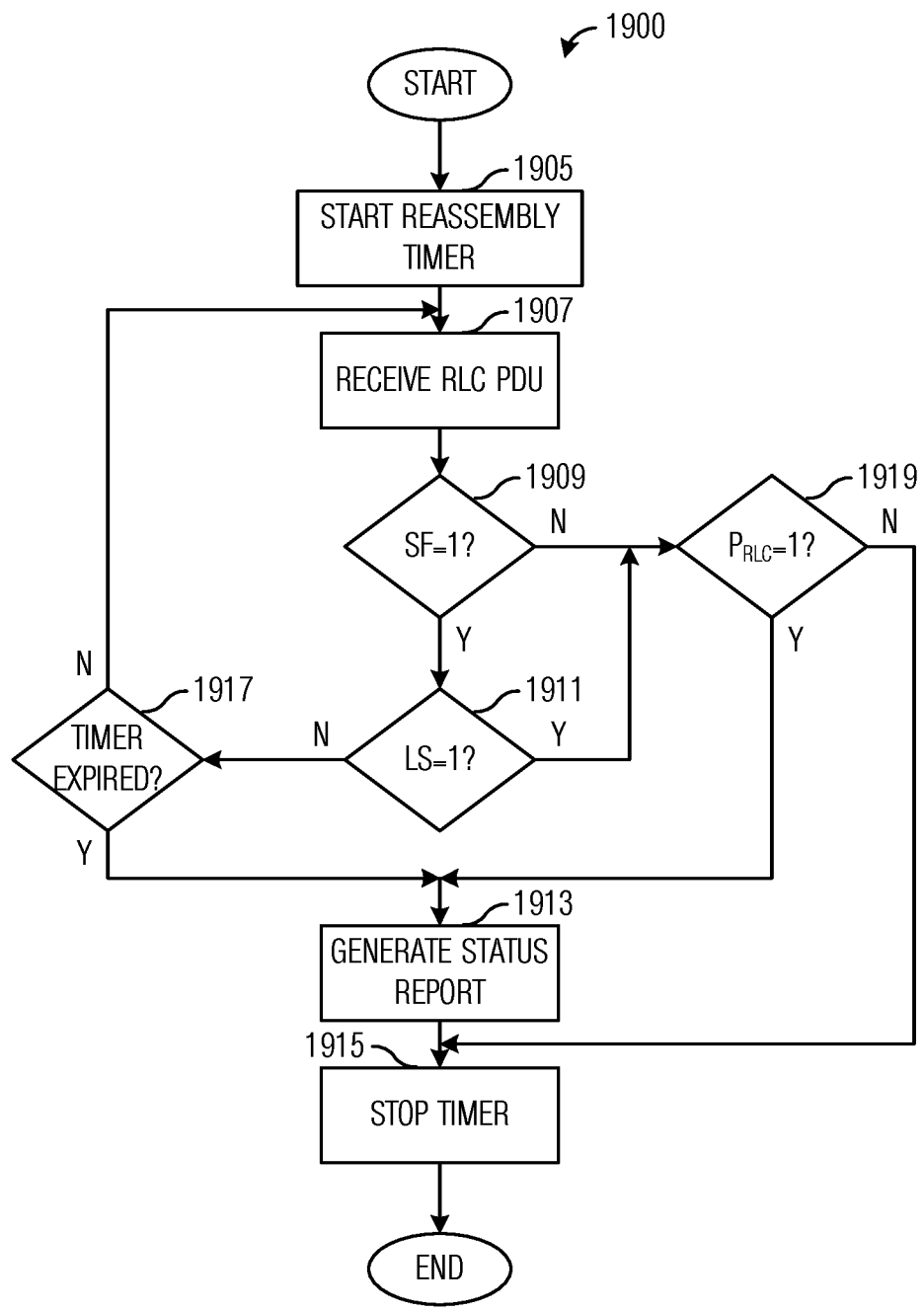
FIG. 19 illustrates a flow diagram of example operations occurring in a serving node during RLC processing according to example embodiments described herein.

FIG. 19 illustrates a flow diagram of example operations 1900 providing RLC processing. Operations 1900 may be indicative of operations occurring in a serving node that is processing an RLC PDU.

Operations 1900 begin with the serving node starting a reassembly timer (block 1905). The reassembly timer provides a time-out period for the reassembling of segmented RLC PDUs. The serving node receives a RLC PDU (block 1907) and performs a check to determine if the RLC PDU contains a PDU segment (i.e., SF=1) or a complete PDU (i.e., SF=0) (block 1909). If the RLC PDU contains a PDU segment (i.e., SF=1), the serving node performs a check to determine if the RLC PDU contains the last PDU segment (i.e., LS=1) (block 1911). If the RLC PDU contains the last PDU segment, the operation continues at block 1919.

If the RLC PDU is segmented but is not the last segment, the serving node performs a check to determine if the reassembly timer is expired (block 1917). If the reassembly timer is expired, the serving node generates a status report (block 1913) and stops the reassembly timer (block 1915). If the reassembly timer is not expired, the serving node returns to block 1907 to receive a subsequent RLC PDU.

If, at block 1909, the serving node determines that the RLC PDU contains a complete PDU (i.e., SF=0), the operation continues at block 1919. At block 1919, the serving node performs a check to determine if AM operation is requested (i.e., $P_{RLC}=1$). If AM operation is requested, the serving node generates a status report (block 1913) and stops the reassembly timer (block 1915). If AM operation is not requested, the serving node stops the reassembly timer (block 1915).

Figure 20:
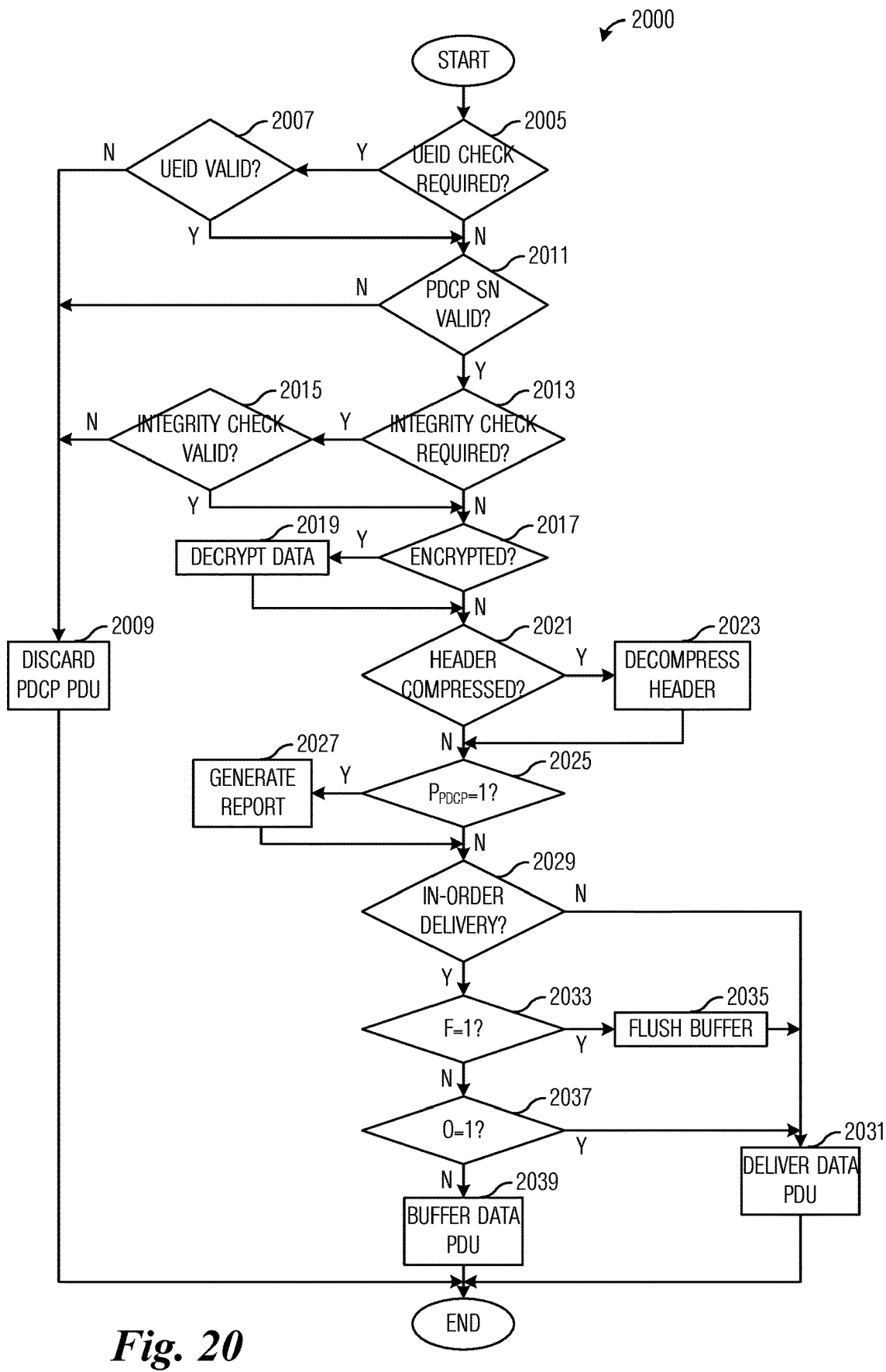
FIG. 20 illustrates a flow diagram of example operations occurring in an anchor node during PDCP processing according to example embodiments described herein.

FIG. 20 illustrates a flow diagram of example operations 2000 providing PDCP processing. Operations 2000 may be indicative of operations occurring in an anchor node during PDCP processing.

Operations 2000 begin with the anchor node performing a check to determine if an integrity check is required for an UEID associated with a PDCP PDU (block 2005). If an integrity check is required, the anchor node performs a check to determine if the UEID is valid (block 2007). If the UEID is invalid, the anchor node discards the PDCP PDU (block 2009) and operations 2000 terminate. If the UEID is valid or if the UEID does not require an integrity check, the anchor node performs a check to determine if the PDCP sequence number is valid (block 2011). If the PDCP sequence number is invalid, the anchor node discards the PDCP PDU (block 2009) and operations 2000 terminate.

If the PDCP sequence number is valid, the anchor node performs a check to determine if an integrity check is required for the PDCP PDU (block 2013). If an integrity check is required, the anchor node performs a check to determine if the integrity of the PDCP PDU is valid (block 2015). If the integrity of the PDCP PDU is invalid, the anchor node discards the PDCP PDU (block 2009) and operations 2000 terminate. If the integrity of the PDCP PDU is valid or if an integrity check is not required for the PDCP PDU, the anchor node performs a check to determine if the PDCP PDU is encrypted (block 2017).

If the PDCP PDU is encrypted, the anchor node decrypts the PDCP PDU and produces a data PDU (block 2019). If the PDCP PDU is not encrypted or after decrypting the PDCP PDU, the anchor node performs a check to determine if the header of the data PDU is compressed (block 2021). If the header of the data PDU is compressed, the anchor node decompresses the header of the data PDU (block 2023). If the header of the data PDU is not compressed or after uncompressing the header, the anchor node performs a check to determine if a PDCP status report is requested (block 2025). If a PDCP status report is requested, the anchor node generates a report (block 2027). If a PDCP status report is not requested or after generating the report, the anchor node performs a check to determine if in-order delivery is enabled (block 2029).

If in-order delivery is not enabled, the anchor node delivers the data PDU (block 2031) and operations 2000 terminate. If in-order delivery is enabled, the anchor node performs a check to determine if an explicit request that the anchor node flush its buffers is included (i.e., F=1) in the data PDU (block 2033). If the explicit request to flush its buffers is included in the data PDU, the anchor node flushes its buffers (block 2035) and delivers the data PDU (block 2031) and operations 2000 terminate. If the explicit request that the anchor node flush its buffers is not included, the anchor node performs a check to determine if an explicit request for out-of-order delivery is included (i.e., O=1) (block 2037). If the explicit request for out-of-order delivery is included, the anchor node delivers the data PDU (block 2031) and operations 2000 terminate. If out-of-order delivery is not enabled or not explicitly requested, the anchor node buffers the data PDU, delivers any buffered data PDUs that can be delivered in-order (block 2039) and operations 2000 terminate.

In a first aspect, the present application provides a method for managing identities of user devices operating in an inactive mode. The method includes receiving, by a serving device, a first uplink transmission including a user device identifier associated with a user device, transmitting, by the serving device, a first downlink transmission including an indication of an ephemeral identifier assigned to the user device, transmitting, by the serving device, a second downlink transmission including data associated with the ephemeral identifier, and discarding, by the serving device, the ephemeral identifier.

According to a first embodiment of the method according to the first aspect, the first uplink transmission further includes user data. According to a second embodiment of the method according to any preceding embodiment of the first aspect or the first aspect as such, the method also includes receiving, by the serving device, a second uplink transmission associated with the ephemeral identifier. According to a third embodiment of the method according to any preceding embodiment of the first aspect or the first aspect as such, the ephemeral identifier comprises an ephemeral cell radio network temporary identifier (eC-RNTI).

According to a fourth embodiment of the method according to any preceding embodiment of the first aspect or the first aspect as such, the method also includes fetching, by the serving device, a user device context from an anchor device, transmitting, by the serving device, a third downlink transmission associated with the ephemeral identifier, wherein the third downlink transmission includes an assignment of a persistent identifier of the user device, and transmitting, by the serving device, a fourth downlink transmission associated with the persistent identifier. According to a fifth embodiment of the method according to any preceding embodiment of the first aspect or the first aspect as such, the third downlink transmission and the fourth downlink transmission are one and the same. According to a sixth embodiment of the method according to any preceding embodiment of the first aspect or the first aspect as such, generating the persistent identifier includes one of promoting the ephemeral identifier to the persistent identifier, or deriving the persistent identifier in accordance with the user device context. According to a seventh embodiment of the method according to any preceding embodiment of the first aspect or the first aspect as such, the user device context is stored at the serving device after being fetched from the anchor device.

In a second aspect, the present application provides a method for operating a user device in an inactive mode is provided. The method includes transmitting, by the user device, a first uplink transmission including a user device identifier associated with the user device, receiving, by the user device, a first downlink transmission including an indication of an ephemeral identifier assigned to the user device, receiving, by the user device, a second downlink transmission including data associated with the ephemeral identifier, and discarding, by the user device, the ephemeral identifier.

According to a first embodiment of the method according to the second aspect, the first uplink transmission further includes user data. According to a second embodiment of the method according to any preceding embodiment of the second aspect or the second aspect as such, the method also includes starting, by the user device, a listen timer after transmitting the first uplink transmission, wherein discarding the ephemeral identifier occurs after the listen timer expires. According to a third embodiment of the method according to any preceding embodiment of the second aspect or the second aspect as such, the method also includes starting, by the user device, a listen timer after transmitting the first uplink transmission, receiving, by the user device, a third downlink transmission associated with the ephemeral identifier, wherein the third downlink transmission includes an assignment of a persistent identifier, and stopping, by the user device, the listen timer. According to a fourth embodiment of the method according to any preceding embodiment of the second aspect or the second aspect as such, the method also includes deriving, by the user device, a security key in accordance with the third downlink transmission, verifying, by the user device, an integrity check of at least a portion of the third downlink transmission in accordance with the security key, and using, by the user device, the persistent identifier when the integrity check passes.

In a third aspect, the present application provides a serving device adapted to manage identities of user devices operating in an inactive mode is provided. The serving device includes a processor, and a computer readable storage medium storing programming for execution by the processor. The programming including instructions to configure the serving device to receive a first uplink transmission including a user device identifier associated with a user device, transmit a first downlink transmission including an indication of an ephemeral identifier assigned to the user device, transmit a second downlink transmission including data associated with the ephemeral identifier, and discard the ephemeral identifier.

According to a first embodiment of the serving device according to the third aspect, the programming includes instructions to configure the serving device to receive a second uplink transmission associated with the ephemeral identifier. According to a second embodiment of the serving device according to any preceding embodiment of the third aspect or the third aspect as such, the programming includes instructions to configure the serving device to fetch a user device context from an anchor device, transmit a third downlink transmission associated with the ephemeral identifier, wherein the third downlink transmission includes an assignment of a persistent identifier of the user device, and transmit a fourth downlink transmission associated with the persistent identifier. According to a third embodiment of the serving device according to any preceding embodiment of the third aspect or the third aspect as such, the programming includes instructions to configure the serving device to one of promote the ephemeral identifier to the persistent identifier, or derive the persistent identifier in accordance with the user device context.

In a fourth aspect, the present application provides a user device adapted to operate in an inactive mode is provided. The user device includes a processor, and a computer readable storage medium storing programming for execution by the processor. The programming including instructions to configure the user device to transmit a first uplink transmission including a user device identifier associated with the user device, receive a first downlink transmission including an indication of an ephemeral identifier assigned to the user device, receive a second downlink transmission including data associated with the ephemeral identifier, and discard the ephemeral identifier.

According to a first embodiment of the user device according to the fourth aspect, the programming includes instructions to configure the user device to start a listen timer after the first uplink transmission is transmitted, wherein the ephemeral identifier is discarded after the listen timer expires. According to a second embodiment of the serving device according to any preceding embodiment of the fourth aspect or the fourth aspect as such, the programming includes instructions to configure the user device to start a listen timer after transmitting the first uplink transmission, receive a third downlink transmission associated with the ephemeral identifier, wherein the third downlink transmission includes an assignment of a persistent identifier, and stop the listen timer. According to a third embodiment of the serving device according to any preceding embodiment of the fourth aspect or the fourth aspect as such, the programming includes instructions to configure the user device to derive a security key in accordance with the third downlink transmission, verify an integrity check of at least a portion of the third downlink transmission in accordance with the security key, and use the persistent identifier when the integrity check passes.

Figure 21:
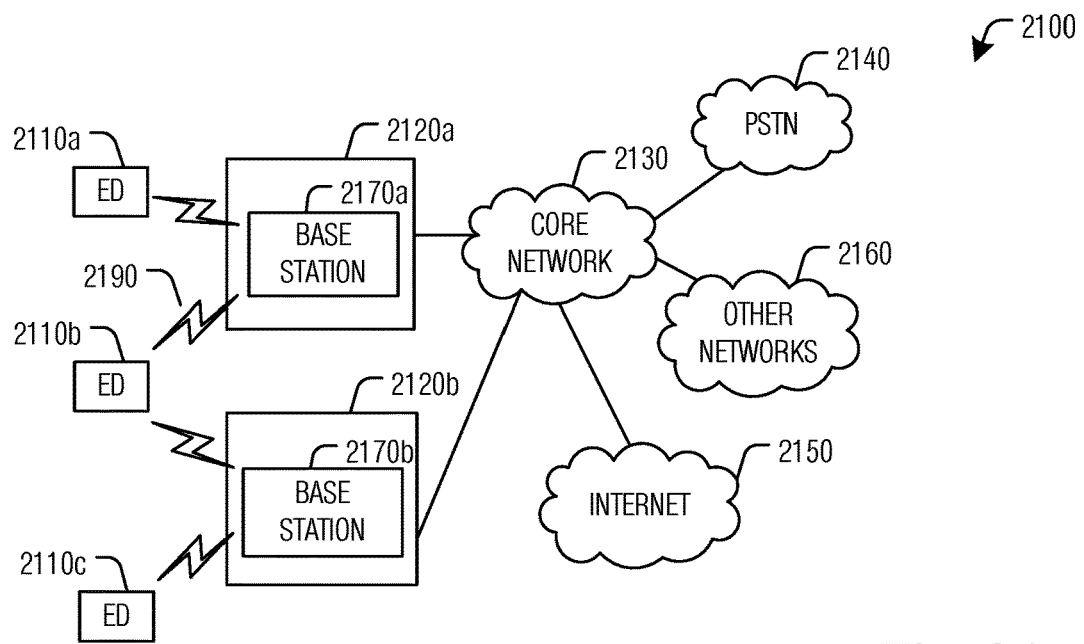
FIG. 21 illustrates an example communication system according to example embodiments described herein.

FIG. 21 illustrates an example communication system 2100. In general, the system 2100 enables multiple wireless or wired users to transmit and receive data and other content. The system 2100 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 2100 includes electronic devices (ED) 2110a-2110c, radio access networks (RANs) 2120a-2120b, a core network 2130, a public switched telephone network (PSTN) 2140, the Internet 2150, and other networks 2160. While certain numbers of these components or elements are shown in FIG. 21, any number of these components or elements may be included in the system 2100.

The EDs 2110a-2110c are configured to operate and/or communicate in the system 2100. For example, the EDs 2110a-2110C are configured to transmit and/or receive via wireless or wired communication channels. Each ED 2110a-2110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 2120a-2120b here include base stations 2170a-2170b, respectively. Each base station 2170a-2170b is configured to wirelessly interface with one or more of the EDs 2110a-2110C to enable access to the core network 2130, the PSTN 2140, the Internet 2150, and/or the other networks 2160. For example, the base stations 2170a-2170b may include (or be) one or more of several well-known devices, such as a base transceiver station (BTS), a Node-B (NodeB), an evolved NodeB (eNodeB), a Home NodeB, a Home eNodeB, a gNB, a cell site controller, an access point (AP), or a wireless router. The EDs 2110a-2110c are configured to interface and communicate with the Internet 2150 and may access the core network 2130, the PSTN 2140, and/or the other networks 2160.

In the embodiment shown in FIG. 21, the base station 2170a forms part of the RAN 2120a, which may include other base stations, elements, and/or devices. Also, the base station 2170b forms part of the RAN 2120b, which may include other base stations, elements, and/or devices. Each base station 2170a-2170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 2170a-2170b communicate with one or more of the EDs 2110a-2110C over one or more air interfaces 2190 using wireless communication links. The air interfaces 2190 may utilize any suitable radio access technology.

It is contemplated that the system 2100 may use multiple channel access functionality, including such schemes as described above. In particular embodiments, the base stations and EDs implement LTE, and/or 5G NR. Of course, other multiple access schemes and wireless protocols may be utilized.

The RANs 2120a-2120b are in communication with the core network 2130 to provide the EDs 2110a-2110c with voice, data, application, Voice over Internet Protocol (VoIP), or other services. Understandably, the RANs 2120a-2120b and/or the core network 2130 may be in direct or indirect communication with one or more other RANs (not shown). The core network 2130 may also serve as a gateway access for other networks (such as the PSTN 2140, the Internet 2150, and the other networks 2160). In addition, some or all of the EDs 2110a-2110c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 2150.

Although FIG. 21 illustrates one example of a communication system, various changes may be made to FIG. 21. For example, the communication system 2100 could include any number of EDs, base stations, networks, or other components in any suitable configuration.

Figure 22A:
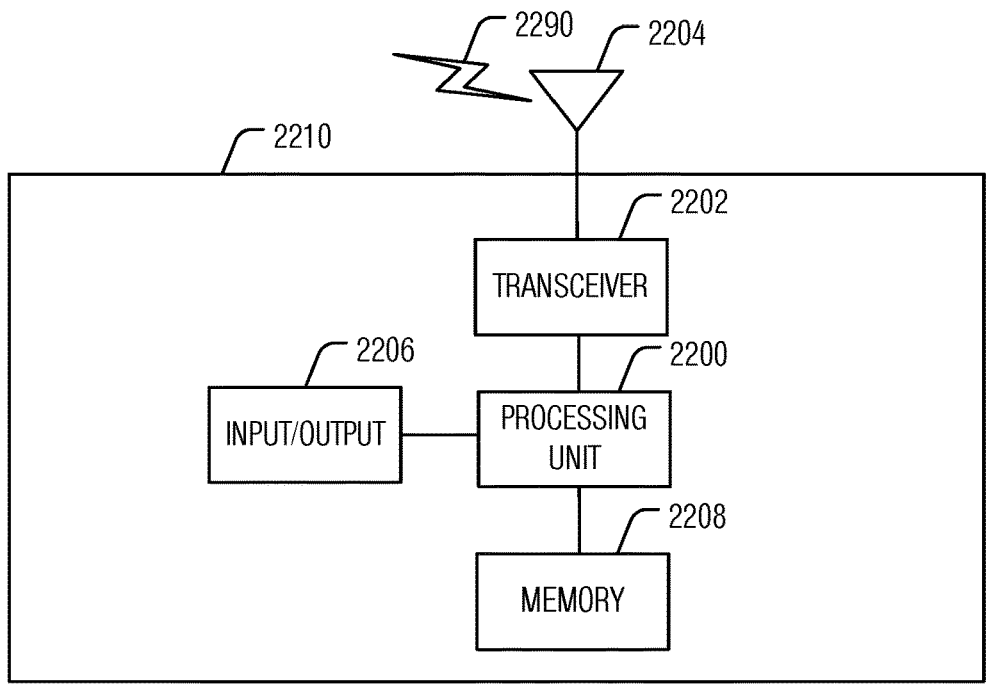
FIGS. 22A and 22B illustrate example devices that may implement the methods and teachings according to this disclosure.
Figure 22B:
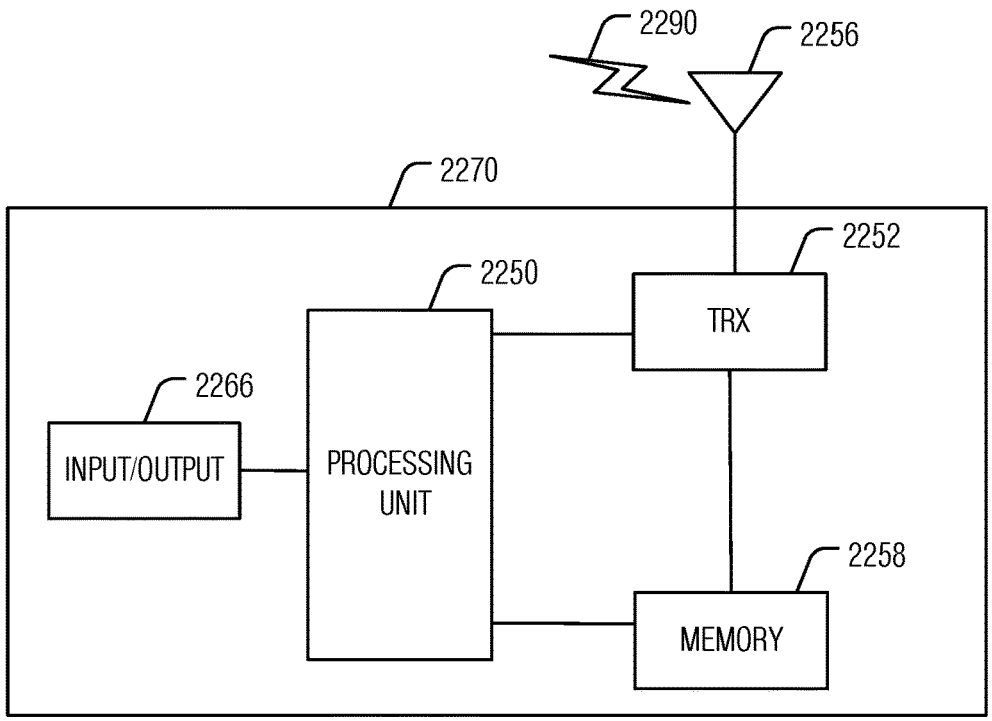

FIGS. 22A and 22B illustrate example devices that may implement the methods and teachings according to this disclosure. In particular, FIG. 22A illustrates an example ED 2210, and FIG. 22B illustrates an example base station 2270. These components could be used in the system 2100 or in any other suitable system.

As shown in FIG. 22A, the ED 2210 includes at least one processing unit 2200. The processing unit 2200 implements various processing operations of the ED 2210. For example, the processing unit 2200 could perform signal coding, data processing, power control, input/output processing, or any other functionality enabling the ED 2210 to operate in the system 2100. The processing unit 2200 also supports the methods and teachings described in more detail above. Each processing unit 2200 includes any suitable processing or computing device configured to perform one or more operations. Each processing unit 2200 could, for example, include a microprocessor, microcontroller, digital signal processor, field programmable gate array, or application specific integrated circuit.

The ED 2210 also includes at least one transceiver 2202. The transceiver 2202 is configured to modulate data or other content for transmission by at least one antenna or NIC (Network Interface Controller) 2204. The transceiver 2202 is also configured to demodulate data or other content received by the at least one antenna 2204. Each transceiver 2202 includes any suitable structure for generating signals for wireless or wired transmission and/or processing signals received wirelessly or by wire. Each antenna 2204 includes any suitable structure for transmitting and/or receiving wireless or wired signals. One or multiple transceivers 2202 could be used in the ED 2210, and one or multiple antennas 2204 could be used in the ED 2210. Although shown as a single functional unit, a transceiver 2202 could also be implemented using at least one transmitter and at least one separate receiver.

The ED 2210 further includes one or more input/output devices 2206 or interfaces (such as a wired interface to the Internet 2150). The input/output devices 2206 facilitate interaction with a user or other devices (network communications) in the network. Each input/output device 2206 includes any suitable structure for providing information to or receiving/providing information from a user, such as a speaker, microphone, keypad, keyboard, display, or touch screen, including network interface communications.

In addition, the ED 2210 includes at least one memory 2208. The memory 2208 stores instructions and data used, generated, or collected by the ED 2210. For example, the memory 2208 could store software or firmware instructions executed by the processing unit(s) 2200 and data used to reduce or eliminate interference in incoming signals. Each memory 2208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 22B, the base station 2270 includes at least one processing unit 2250, at least one transceiver 2252, which includes functionality for a transmitter and a receiver, one or more antennas 2256, at least one memory 2258, and one or more input/output devices or interfaces 2266. A scheduler, which would be understood by one skilled in the art, is coupled to the processing unit 2250. The scheduler could be included within or operated separately from the base station 2270. The processing unit 2250 implements various processing operations of the base station 2270, such as signal coding, data processing, power control, input/output processing, or any other functionality. The processing unit 2250 can also support the methods and teachings described in more detail above. Each processing unit 2250 includes any suitable processing or computing device configured to perform one or more operations. Each processing unit 2250 could, for example, include a microprocessor, microcontroller, digital signal processor, field programmable gate array, or application specific integrated circuit.

Each transceiver 2252 includes any suitable structure for generating signals for wireless or wired transmission to one or more EDs or other devices. Each transceiver 2252 further includes any suitable structure for processing signals received wirelessly or by wire from one or more EDs or other devices. Although shown combined as a transceiver 2252, a transmitter and a receiver could be separate components. Each antenna 2256 includes any suitable structure for transmitting and/or receiving wireless or wired signals. While a common antenna 2256 is shown here as being coupled to the transceiver 2252, one or more antennas 2256 could be coupled to the transceiver(s) 2252, allowing separate antennas 2256 to be coupled to the transmitter and the receiver if equipped as separate components. Each memory 2258 includes any suitable volatile and/or non-volatile storage and retrieval device(s). Each input/output device 2266 facilitates interaction with a user or other devices (network communications) in the network. Each input/output device 2266 includes any suitable structure for providing information to or receiving/providing information from a user, including network interface communications.

Figure 23:
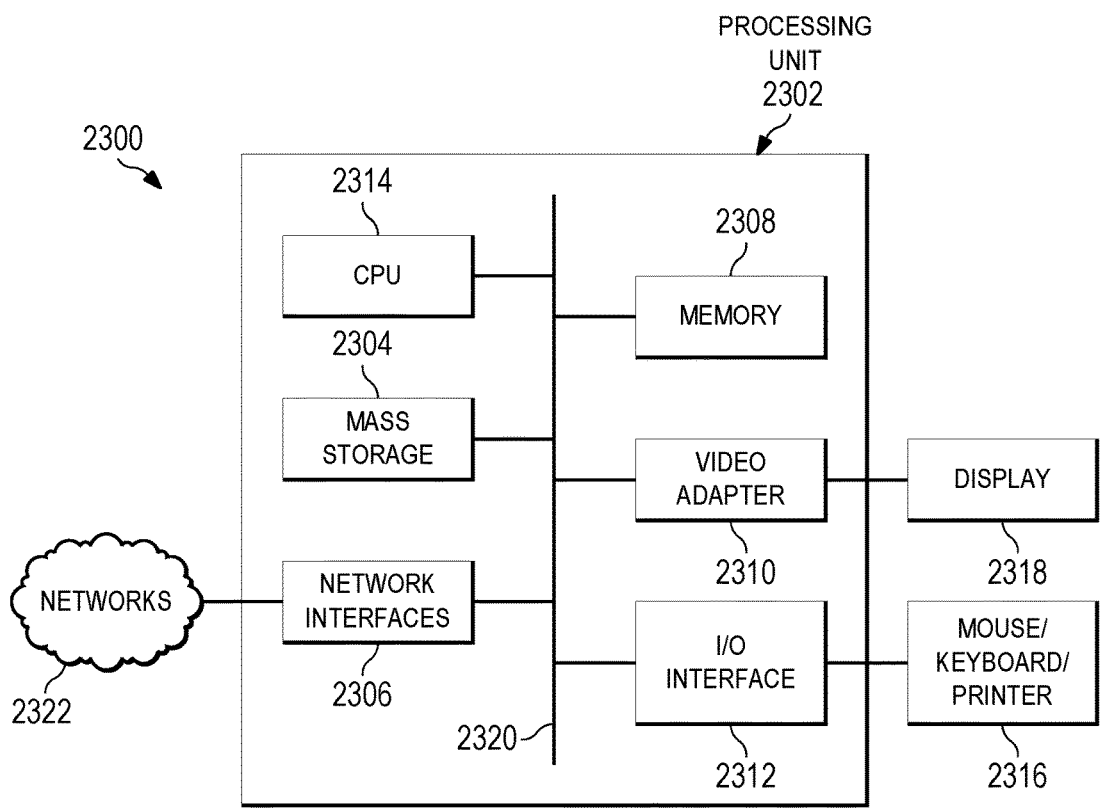
FIG. 23 is a block diagram of a computing system that may be used for implementing the devices and methods disclosed herein.

FIG. 23 is a block diagram of a computing system 2300 that may be used for implementing the devices and methods disclosed herein. For example, the computing system can be any entity of UE, access network (AN), mobility management (MM), session management (SM), UPGW, access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2300 includes a processing unit 2302. The processing unit includes a central processing unit (CPU) 2314, memory 2308, and may further include a mass storage device 2304, a video adapter 2310, and an I/O interface 2312 connected to a bus 2320.

The bus 2320 may be one or more of any type of several bus architectures including a memory bus or memory controller, a peripheral bus, or a video bus. The CPU 2314 may comprise any type of electronic data processor. The memory 2308 may comprise any type of non-transitory system memory such as static random access memory (SRAM), dynamic random access memory (DRAM), synchronous DRAM (SDRAM), read-only memory (ROM), or a combination thereof. In an embodiment, the memory 2308 may include ROM for use at boot-up, and DRAM for program and data storage for use while executing programs.

The mass storage 2304 may comprise any type of non-transitory storage device configured to store data, programs, and other information and to make the data, programs, and other information accessible via the bus 2320. The mass storage 2304 may comprise, for example, one or more of a solid state drive, hard disk drive, a magnetic disk drive, or an optical disk drive.

The video adapter 2310 and the I/O interface 2312 provide interfaces to couple external input and output devices to the processing unit 2302. As illustrated, examples of input and output devices include a display 2318 coupled to the video adapter 2310 and a mouse/keyboard/printer 2316 coupled to the I/O interface 2312. Other devices may be coupled to the processing unit 2302, and additional or fewer interface cards may be utilized. For example, a serial interface such as Universal Serial Bus (USB) (not shown) may be used to provide an interface for an external device.

The processing unit 2302 also includes one or more network interfaces 2306, which may comprise wired links, such as an Ethernet cable, and/or wireless links to access nodes or different networks. The network interfaces 2306 allow the processing unit 2302 to communicate with remote units via the networks. For example, the network interfaces 2306 may provide wireless communication via one or more transmitters/transmit antennas and one or more receivers/receive antennas. In an embodiment, the processing unit 2302 is coupled to a local-area network 2322 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a forwarding unit/module, a fetching unit/module, a generating unit/module, a promoting unit/module, a deriving unit/module, a starting unit/module, a discarding unit/module, a stopping unit/module, and/or a using unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for communication in a wireless communication system, the method comprising:
   receiving, by an anchor node in the wireless communication system, data from a serving node in the wireless communication system, the data including: user data of a user equipment (UE) that is cryptographically encoded, a UE identifier (UE ID) of the UE that transmitted the user data to the serving node, a sequence number associated with the user data, and a session identifier (session ID) identifying a session associated with the user data, the anchor node having UE-specific context information of the UE;
   determining, by the anchor node based on the data received from the serving node, a UE context associated with the UE ID, the UE context comprising session information associated with the session identified by the session ID, and the UE context further comprising a range of allowed sequence numbers associated with the session ID, and cryptographic keying material associated with the UE;
   validating, by the anchor node, that the sequence number associated with the user data is within the range of allowed sequence numbers to determine whether to decrypt the user data;
   decrypting, by the anchor node upon validating that the sequence number associated with the user data is within the range of allowed sequence numbers, the user data using the sequence number associated with the user data and using the cryptographic keying material associated with the UE; and
   transmitting, by the anchor node, the user data that is decrypted to a core network component in the wireless communication system, the core network component associated with the session information identified by the session ID received from the serving node.

2. The method of claim 1, wherein the UE context comprises at least one of:
   a data radio bearer identifier (DRB ID);
   a logical channel identifier (LCID);
   a DRB configuration;
   a logical channel configuration;
   a cryptographic key;
   a cryptographic counter;
   a radio resource control configuration parameter associated with the UE; and
   a protocol data unit (PDU) sequence number.

3. The method of claim 1, wherein the session ID is one of:
   a logical channel identifier (LCID); or
   a data radio bearer identifier (DRB ID).

4. The method of claim 1, further comprising transmitting, by the anchor node to the UE, via the serving node, an acknowledgement of reception of the user data by the anchor node.

5. The method of claim 4, wherein the acknowledgement of reception is cryptographically protected in accordance with the cryptographic keying material associated with the UE.

6. The method of claim 1, wherein the user data is conveyed in a packet data convergence protocol data unit.

7. The method of claim 4, wherein the acknowledgement of reception is conveyed in a packet data convergence protocol data unit.

8. An anchor node in a wireless communication system, the anchor node comprising:
   a receiver configured to receive data from a serving node in the wireless communication system, the data including: user data of a user equipment (UE) that is cryptographically encoded, a UE identifier (UE ID) of the UE that transmitted the user data to the serving node, a sequence number associated with the user data, and a session identifier (session ID) identifying a session associated with the user data, the anchor node having UE-specific context information of the UE;
   a processor configured to retrieve UE context associated with the UE ID received from the serving node, the UE context comprising session information associated with the session identified by the session ID, a range of allowed sequence numbers associated with the session ID, and cryptographic keying material associated with the UE, to validate that the sequence number associated with the user data is within the range of allowed sequence numbers to determine whether to decrypt the user data, and, upon validating that the sequence number associated with the user data is within the range of allowed sequence numbers, to decrypt the user data using the sequence number associated with the user data and using the cryptographic keying material associated with the UE; and
   a transmitter configured to transmit the user data that is decrypted to a core network component in the wireless communication system, the core network component associated with the session information identified by the session ID received from the serving node.

9. The anchor node of claim 8, wherein the UE context comprises at least one of:
   a data radio bearer identifier (DRB ID);
   a logical channel identifier (LCID);
   a DRB configuration;
   a logical channel configuration;
   a cryptographic key;
   a cryptographic counter;
   a radio resource control configuration parameter associated with the UE; and
   a protocol data unit (PDU) sequence number.

10. The anchor node of claim 8, wherein the session ID is one of:
    a logical channel identifier (LCID); or
    a data radio bearer identifier (DRB ID).

11. The anchor node of claim 8, wherein the anchor node transmits, to the UE, via the serving node, an acknowledgement of reception of the user data.

12. The anchor node of claim 11, wherein the acknowledgement of reception is cryptographically protected in accordance with the cryptographic keying material associated with the UE.

13. The anchor node of claim 8, wherein the user data is conveyed in a packet data convergence protocol data unit.

14. The anchor node of claim 11, wherein the acknowledgement of reception is conveyed in a packet data convergence protocol data unit.

* * * * *